United States Patent

Ohsuga et al.

[11] Patent Number: 5,960,759
[45] Date of Patent: Oct. 5, 1999

[54] SUCTION DEVICE FOR INTERNAL COMBUSTION ENGINE

[75] Inventors: Minoru Ohsuga; Junichi Yamaguchi, both of Katsuta; Nobuo Kurihara, Hitachioota; Yasushi Sasaki, Naka-gun, all of Japan

[73] Assignee: Hitachi, Ltd., Tokyo, Japan

[21] Appl. No.: 08/715,627

[22] Filed: Sep. 18, 1996

Related U.S. Application Data

[62] Division of application No. 08/307,461, Sep. 19, 1994, Pat. No. 5,638,784.

[30] Foreign Application Priority Data

Sep. 17, 1993 [JP] Japan .................................. 5-231251

[51] Int. Cl.$^6$ .................................................... F02B 27/00
[52] U.S. Cl. ............................... 123/184.31; 123/568.17; 123/308
[58] Field of Search .................. 123/184.34, 184.42, 123/184.33, 568, 306, 184.49

[56] References Cited

U.S. PATENT DOCUMENTS

| | | | |
|---|---|---|---|
| 4,741,295 | 5/1988 | Mosoya et al. | 123/184.31 |
| 4,829,941 | 5/1989 | Hitomi et al. | 123/184.31 |
| 4,889,082 | 12/1989 | Hitomi et al. | 123/184.31 |
| 4,972,814 | 11/1990 | Matsuki et al. | 123/184.52 |
| 5,056,473 | 10/1991 | Asaki et al. | 123/184.31 |

FOREIGN PATENT DOCUMENTS

| | | |
|---|---|---|
| 0523027 | 1/1993 | European Pat. Off. . |
| 2702160 | 7/1978 | Germany . |
| 187520 | 8/1986 | Japan . |
| 100269 | 9/1988 | Japan . |

*Primary Examiner*—Marguerite McMahon
*Attorney, Agent, or Firm*—Antonelli, Terry, Stout & Kraus, LLP

[57] ABSTRACT

The object of this invention is that a suction devise for an internal combustion engine is to be compact.

The suction devise comprising a casing having an air inlet and a plurality of outlets, a filter in the casing for filtering air from said air inlet, a collection chamber in the casing for receiving air from the filter, at least one throttle valve in the casing for controlling the flow of air from said filter to said collection chamber, and a plurality of suction pipes.

According to the present invention, the suction device can be made compact to thereby effectively use an engine room of an automobile.

15 Claims, 32 Drawing Sheets

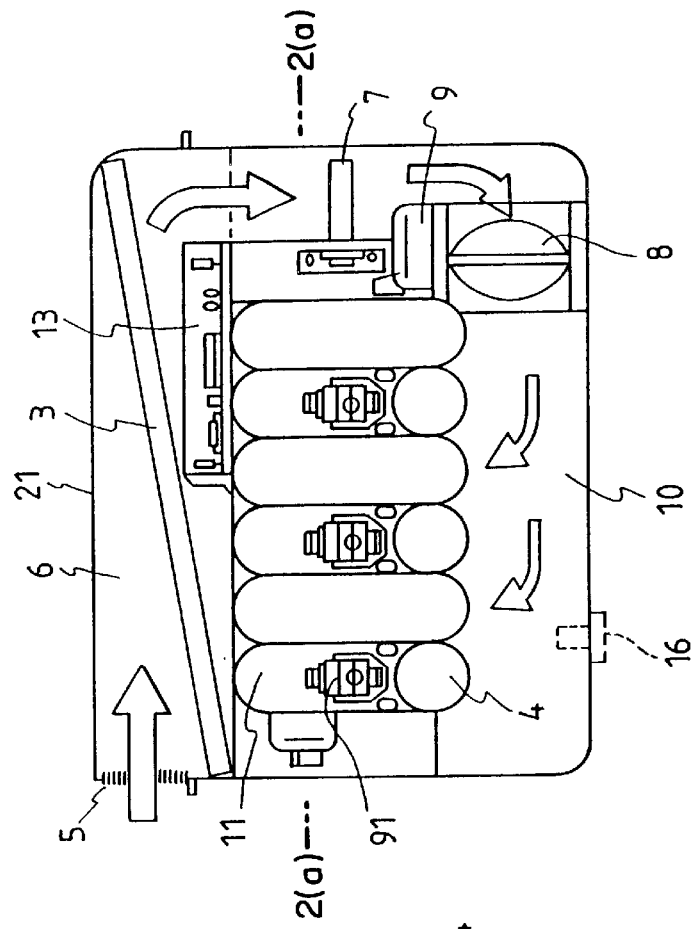
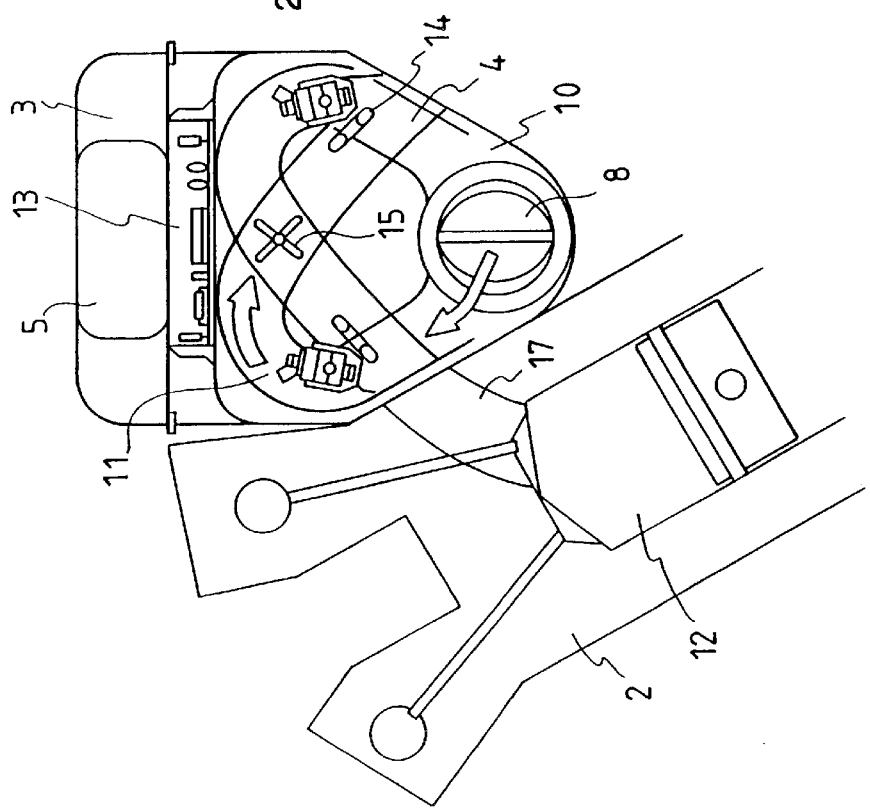

SUCTION DEVICE FOR INTERNAL COMBUSTION ENGINE

This application is a divisional application of application Ser. No. 08/307,461, filed Sep. 19, 1994, now U.S. Pat. No. 5,638,784 the subject matter of which is incorporated herein by reference.

BACKGROUND OF THE INVENTION

1. Field

The present invention relates to a suction device for supplying air and fuel to combustion chambers of an internal combustion engine, and more particularly to such a suction device which can be constructed compactly.

2. Prior Art

In connection with a V-type internal combustion engine having a plurality of cylinders arranged in a V-shape, there is described a conventional suction device in U.S. Pat. Nos. 5,003,933 and 5,094,194, for example. In this conventional suction device, a plurality of individual suction pipes and a collector for distributing a suction air to the individual suction pipes are integrated compactly, but an air cleaner, a suction air quantity detecting means, a throttle valve, and fuel injection valves are not integrated. These latter elements are individually mounted.

We described a problem to be solved by the invention.

It is an object of the present invention to provide a suction device which can be constructed compactly so as to integrate all parts from an air cleaner to suction ports and eliminate any spaces other than an air passage for supplying a suction air to an internal combustion engine, thereby widening spaces for mounting other parts and the internal combustion engine in an engine room of an automobile or reducing a size of the engine room to effectively use the engine room.

The invention has below functions.

A casing of a suction device has such a shape as to be fitted with a space defined between right and left banks of a V-type internal combustion engine. The inside of the casing is partitioned into several spaces for mounting an air cleaner, a collector, and a plurality of individual suction pipes in such a manner that these elements are arranged adjacent to each other.

The air cleaner, the collector, and the individual suction pipes are arranged adjacent to each other through a partition, thereby forming an air passage in each element. Accordingly, all parts constituting the suction device can be integrated, and any unnecessary spaces other than the air passage can be eliminated to thereby realize a compact structure of the suction device.

SUMMARY OF THE INVENTION

In summary, the present invention provides a compact suction device including all parts from an air cleaner to suction ports.

The suction device has below functions. Air admitted from an inlet 5 of an air cleaner 3 is introduced through a passage 6 and an air cleaner element 33 to a suction air quantity detecting means 7. A throttle valve 8 is located downstream of the suction air quantity detecting means 7. The air passed through the throttle valve 8 is introduced through a collector 10 to individual suction pipes 11 corresponding to cylinders of an engine. Thereafter, the air is sucked through suction ports 4 into combustion chambers 12 of the engine. The passage 6, the individual suction pipes 11, and the collector 10 are arranged adjacent to each other through a partition or directly.

Further, a control unit 13 for controlling the engine is located in the passage 6 downstream of the inlet 5 of the air cleaner 3.

According to the present invention, the suction device including the air cleaner to the suction ports can be made compact to thereby effectively use an engine room.

DESCRIPTION OF THE DRAWINGS

FIG. 2 is a schematic view of the suction device.

DESCRIPTION OF THE PREFERRED EMBODIMENTS

Figure 1:
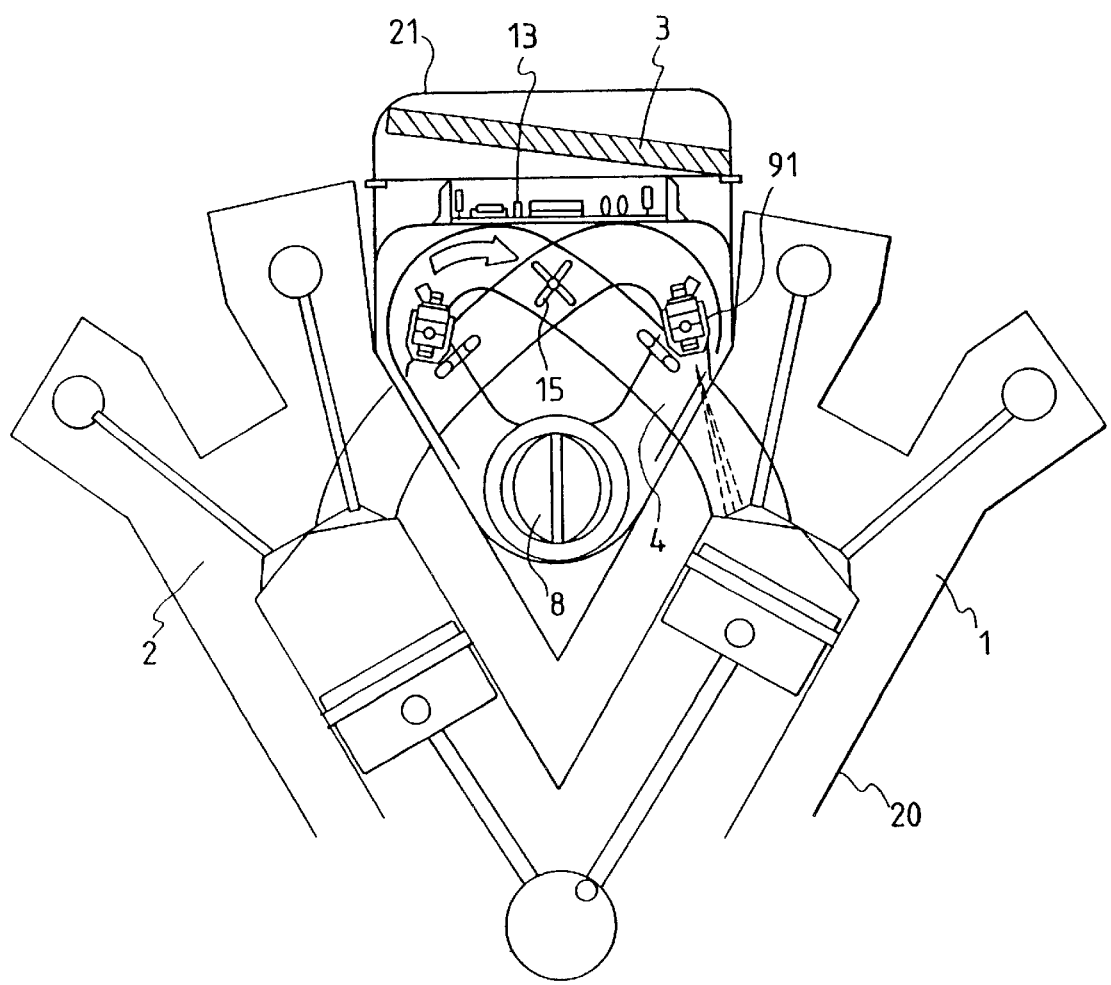
FIG. 1 is a sectional front view of a suction device according to a first preferred embodiment of the present invention as mounted to a V-type internal combustion engine.

A first preferred embodiment of the present invention is shown in FIG. 1, which is a sectional front view of right and left cylinder trains 1 and 2 of an internal combustion engine 20 and a suction device 21. The internal combustion engine 20 is a V-type internal combustion engine wherein the right and left cylinder trains 1 and 2 are so arranged as to form a V-shape as viewed in front elevation. While the number of cylinders in the V-type internal combustion engine 20 is six in this preferred embodiment, it may be eight or twelve as known in the art. The suction device 21 including an air cleaner 3, suction ports 4, or their partial portions is located in a space defined between the right and left cylinder trains 1 and 2.

Thus, the suction device 21 is designed to have a compact structure. FIG. 2a is a sectional front view of the suction device 21 with the right cylinder train 1 not shown, and FIG. 2b is a sectional side view of the suction device 21. As shown in FIGS. 2A and 2B, air admitted from an inlet 5 of the air cleaner 3 is introduced through a passage 6 and an air cleaner element 33 to a suction air quantity detecting means 7. The suction air quantity detecting means 7 is an air flow meter of any type such as a hot-wire type, movable vane type, or Karman vortex type. A throttle valve 8 is provided downstream of the suction air quantity detecting means 7. The throttle valve 8 is electrically driven by a motor 9 in this preferred embodiment; however, it may be mechanically driven by a wire. The air passed through the throttle valve 8 is introduced through a collector 10 into a plurality of individual suction pipes 11 respectively communicating with a plurality of cylinders of the engine 20.

Thereafter, the air is sucked through the suction ports 4 into combustion chambers 12 of the engine 20. In order to make the structure compact, the passage 6 of the air cleaner 3, the individual suction pipes 11, and the collector 10 are arranged in this order from the upper side in adjacent relationship to each other through partitions or directly. The order of arrangement of these sections is not limitative, but the passage 6 of the air cleaner 3, the collector 10, and the individual suction pipes 11 may be arranged in this order from the upper side. A control unit 13 is located in the passage 6 of the air cleaner 3 at a downstream portion thereof in consideration of compactibility and coolability. With this arrangement, the control unit 13 can be cooled by the air flowing in the passage 6. To ensure the compactibility, the control unit 13 is located in the passage 6 just over the top of the individual suction pipes 11 or the collecter 10. A plurality of fuel injection valves 91 for injecting fuel are respectively located in the suction ports 4 of the individual suction pipes 11, and a plurality of air passages (swirl passages) 14 for forming a swirl of air in the combustion chambers 12 are respectively located in the suction ports 4.

Further, a plurality of swirl control valves 15 for controlling the quantity of suction air flowing through the suction ports 4 and the quantity of suction air flowing through the air passages 14 are respectively located in the individual suction pipes 11. In this preferred embodiment, all or at least one of the individual suction pipes 11, the swirl control valves 15, and the fuel injection valves 91 are provided on the collecter 10 serving as a negative pressure chamber downstream of the throttle valve 8. While the suction air quantity detecting means 7 is located upstream of the throttle valve 8 in this preferred embodiment, the detecting means 7 may be located downstream of the throttle valve 8. The throttle valve 8 is mounted to a member (a portion below the line A—A in FIG. 2B) forming the suction ports 4 respectively communicating with suction ports 17 formed in the engine 20.

Figure 3:
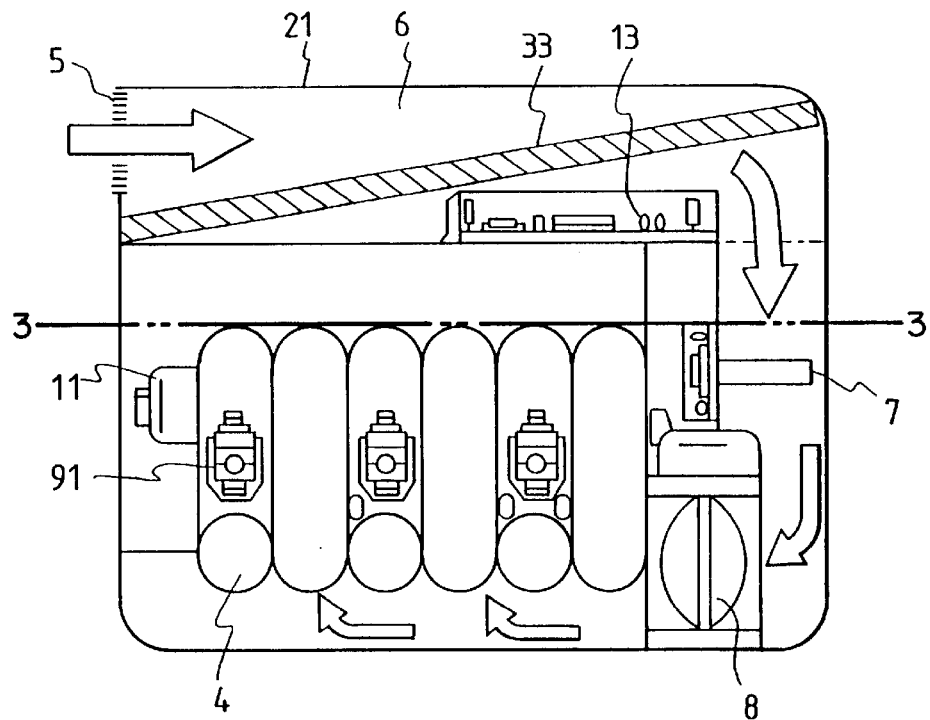
FIG. 3 is a sectional side view of a suction device according to a second preferred embodiment of the present invention.

A second preferred embodiment of the present invention is shown in FIG. 3. In this preferred embodiment, the individual suction pipes 11 and the suction ports 4 communicating with the suction ports 17 of the engine 20 are formed in a single member (a portion below the line A—A in FIG. 3), and the throttle valve 8 is mounted to this member.

Figure 4:
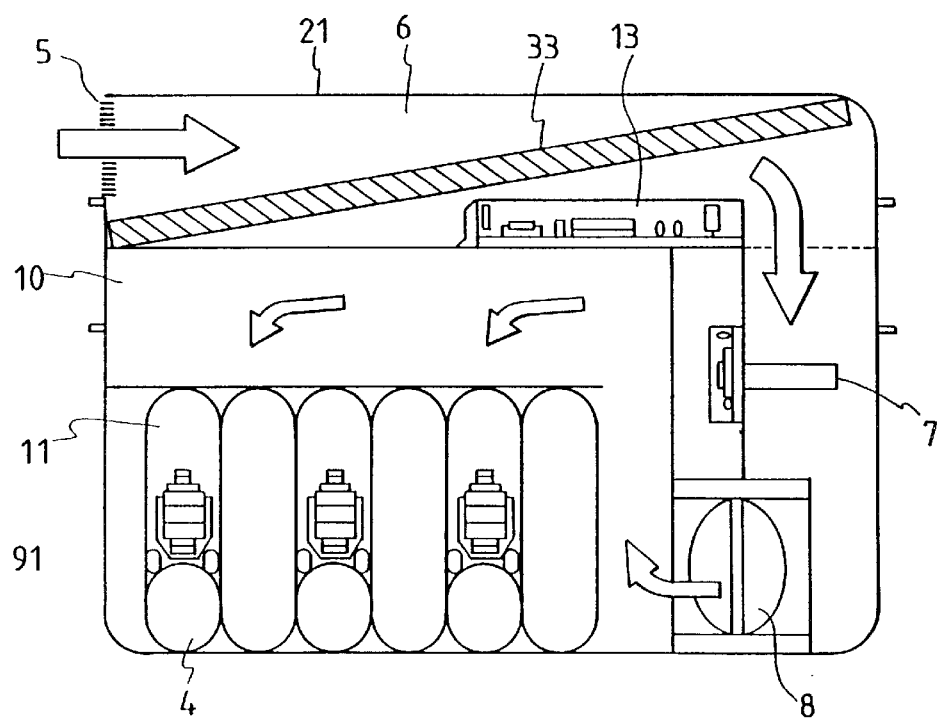
FIG. 4 is a sectional side view of a suction device according to a third preferred embodiment of the present invention.

A third preferred embodiment of the present invention is shown in FIG. 4. In this preferred embodiment, the collector 10 is formed just above the individual suction pipes 11. The air passed through the throttle valve 8 is once raised to the collector 10 and then flows down into the individual suction pipes 11. With this arrangement, the individual suction pipes 11 are located nearer to the engine 20, so that the suction device 21 can be easily mounted to the engine 20 with a simple structure.

Figure 5:
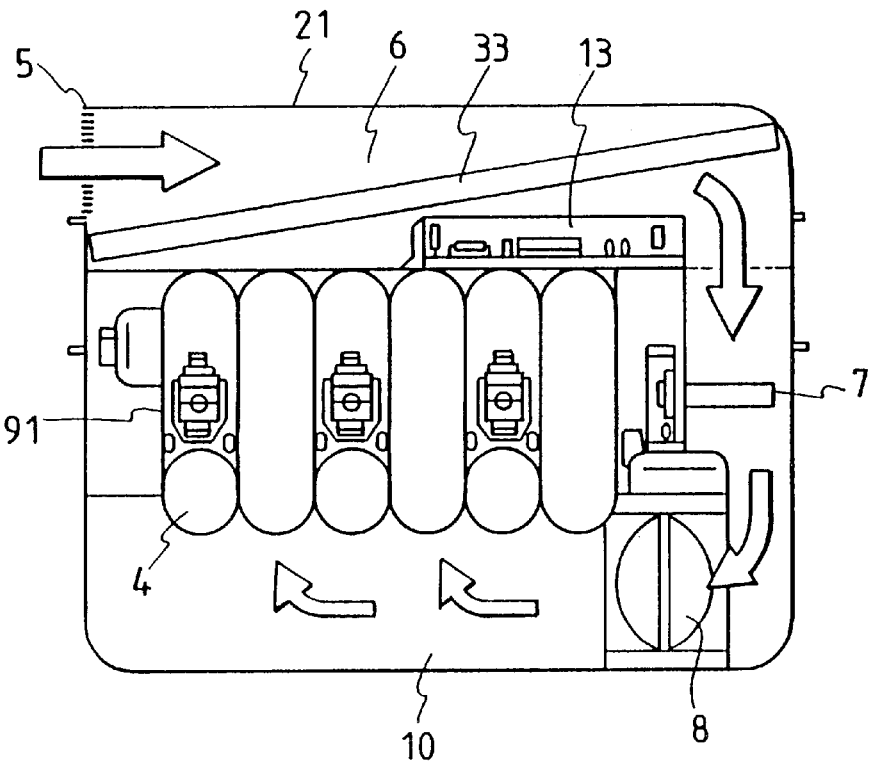
FIG. 5 is a view illustrating a flow of air in the suction device according to the first preferred embodiment.
Figure 6:
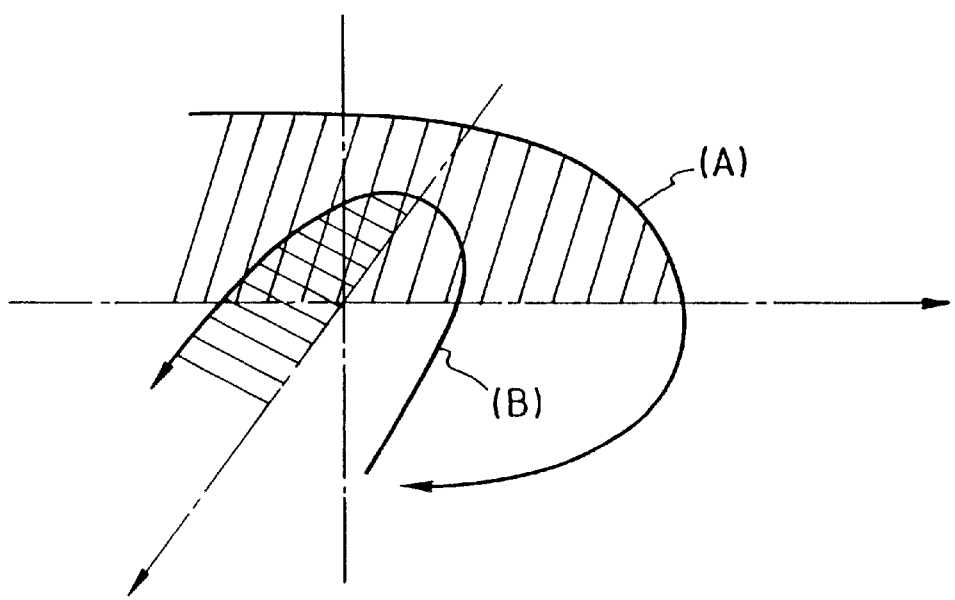
FIG. 6 is a view illustrating a flow of air in the suction device according to the first preferred embodiment.
Figure 7:
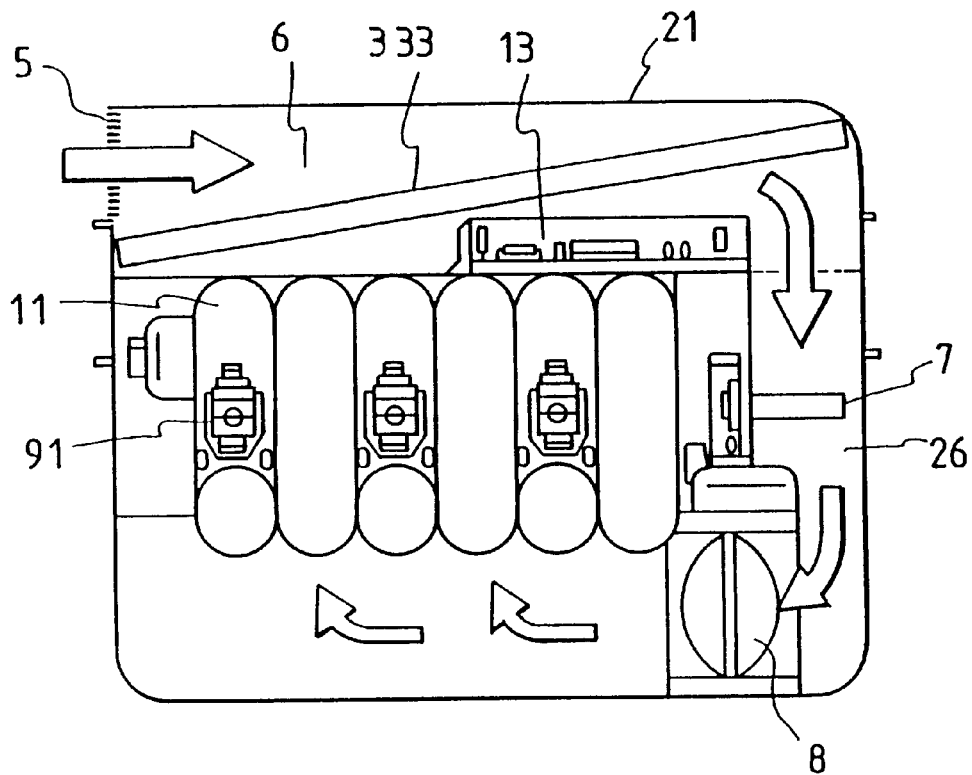
FIG. 7 is a view illustrating a flow of air in the suction device according to the first preferred embodiment.

FIGS. 5, 6, and 7 illustrate the flow of suction air in the first preferred embodiment shown in FIG. 3. The air passage from the inlet 5 of the air cleaner 3 to the collector 10 is formed so that the air flows along a certain plane A as shown in FIG. 6. On the other hand, the air passage from the collector 10 to the suction ports 4 is formed so that the air flows along a certain plane B perpendicular to the plane A as shown in FIG. 6. Thus, the flow of suction air changes in three-dimensional direction at the collector 10 only, thereby reducing a suction resistance.

Figure 8:
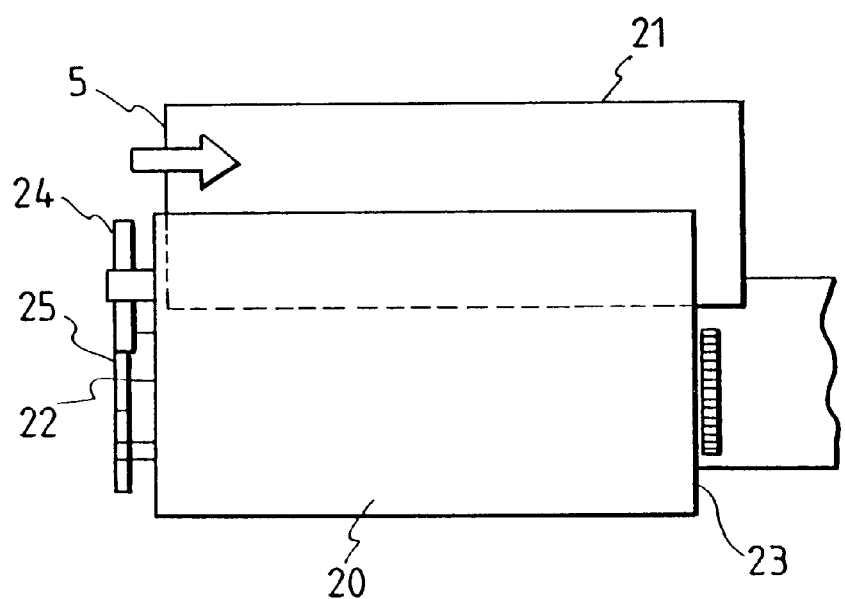
FIG. 8 is a schematic side view illustrating a positional relation between the suction device and the internal combustion engine.

FIG. 8 schematically illustrates a positional relation between the internal combustion engine 20 and the suction device 21 as viewed in side elevation. Reference numerals 22 and 23 denote a front end and a rear end of the engine 20, respectively. The air inlet 5 of the suction device 21 is located just above the front end 22 of the engine 20. Accordingly, when the engine 20 is longitudinally mounted on an automobile in such a manner that the front end 22 of the engine 20 is directed to the front of the automobile, a cool air can be readily introduced from the air inlet 5 of the suction device 21. Further, a pulley 24 and a fan belt 25 are provided at the front end 22 of the engine 20, so that there is no space for arranging the suction air quantity detecting means 7, the throttle valve 8, and a vertical passage 26 (see FIG. 7) at the front end portion of the suction device 21. Accordingly, these elements are arranged at the rear end portion of the suction device 21 just above the rear end 23 of the engine 20. In the suction device 21, these elements are arranged behind the individual suction pipes 11.

Figure 9:
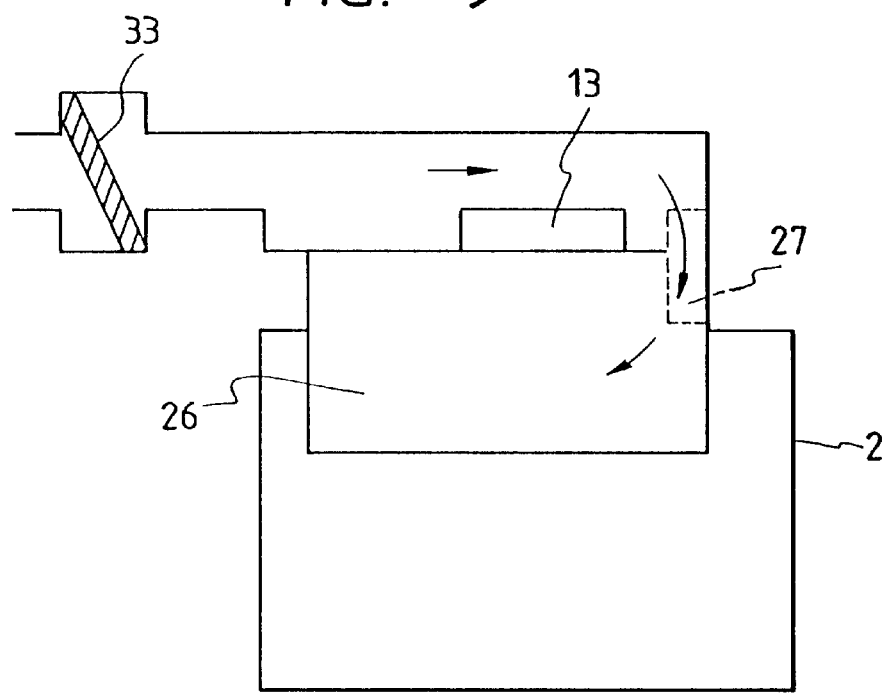
FIG. 9 is a schematic side view illustrating a control unit in the suction device.

FIG. 9 schematically illustrates the arrangement of the control unit 13. As mentioned above, the control unit 13 is located downstream of the air cleaner element 33 in the air passage 6 of the air cleaner 3 in order that the control unit 13 can be cooled by a cool air just introduced from the air inlet 5. Further, in consideration of compactibility of the collector 10 and the individual suction pipes 11 and maintainability of the control unit 13, the control unit 13 is located above a portion 29 where the collector 10 and the individual suction pipes 11 are arranged. Since the control unit 13 must be adjusted upon delivery or inspection after manufactured, the control unit 13 is located at such a position that a lid (not shown) provided on the suction ports 4 can be removed at a portion upstream of a throttle valve mounting portion 30.

Figure 10:
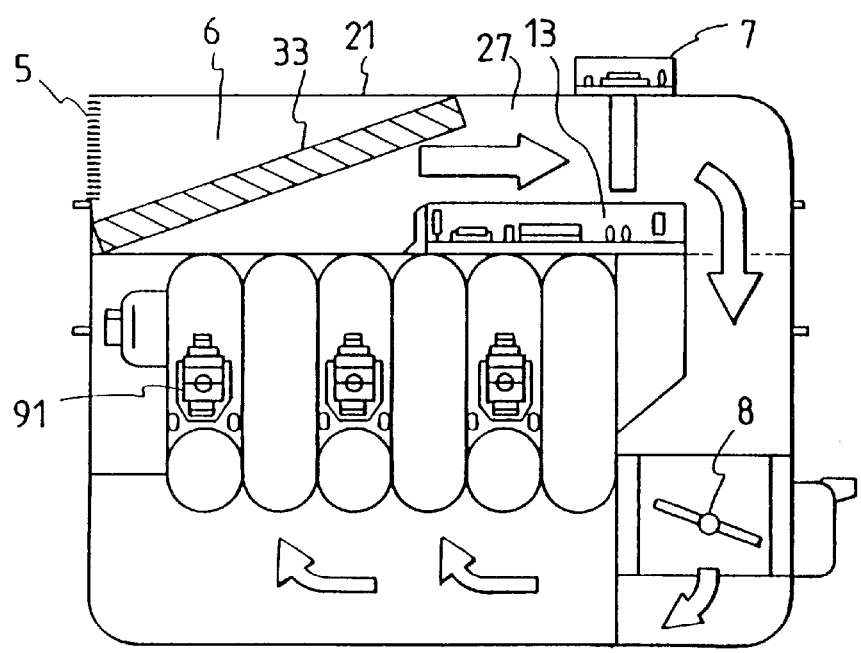
FIG. 10 is a sectional side view of a suction device according to a fourth preferred embodiment of the present invention.

A fourth preferred embodiment of the present invention is shown in FIG. 10. In this preferred embodiment, the air cleaner element 33 is located in a front portion of the air passage 6 of the air cleaner 3, and the suction air quantity detecting means 7 is located in a rear passage portion 27 downstream of the air cleaner element 33. With this arrangement, no bent passage portion is present upstream of the suction air quantity detecting means 7, but a long straight passage portion can be ensured upstream of the detecting means 7, thereby reducing a detection error of the detecting means 7. Further, the throttle valve 8 is located in the vertical passage 26 for the purpose of prevention of fixation of the valve 8 due to stain and for the purpose of improvement in maintainability.

Figure 11:
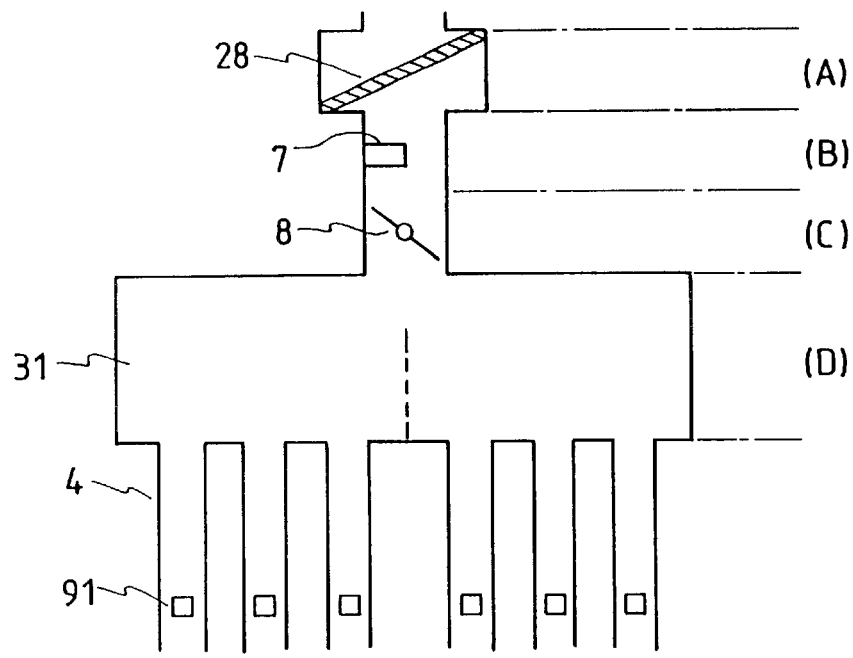
FIG. 11 is a schematic diagram illustrating an air passage shown in FIG. 10.

FIG. 11 schematically illustrates the arrangement of the air passage in the fourth preferred embodiment of FIG. 10. The air cleaner 3, the suction air quantity detecting means 7, the throttle valve 8, and the collector 10 leading to the individual suction pipes 11 having the fuel injection valves 91 are arranged adjacent to each other. That is, as shown in FIG. 11, mounting members A, B, C, and D for respectively mounting the above elements 3, 7, 8, and 10 are connected together in an integral or direct fashion. With this arrangement, it is possible to reduce a detection error of the detecting means 7 due to suction air pulsation caused by blow-back from the combustion chambers upon full opening of the throttle valve 8. That is, since the air passage from the air cleaner 3 to the collector 10 can be shortened, a volume of air column in which vibration occurs can be reduced to thereby reduce the pulsation.

Figure 12:
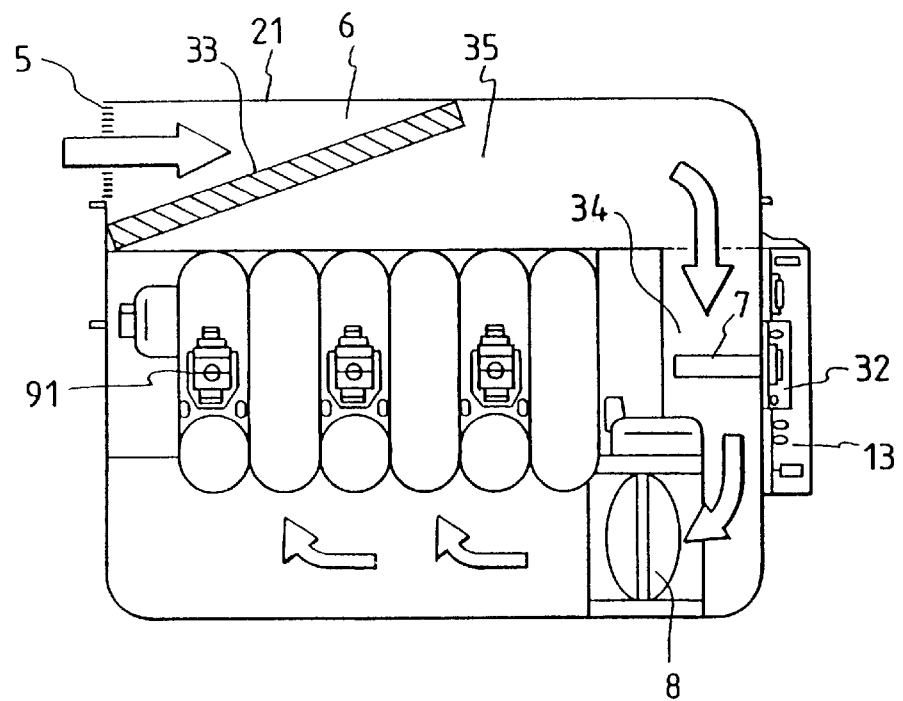
FIG. 12 is a sectional side view of a suction device according to a fifth preferred embodiment of the present invention.
Figure 13:
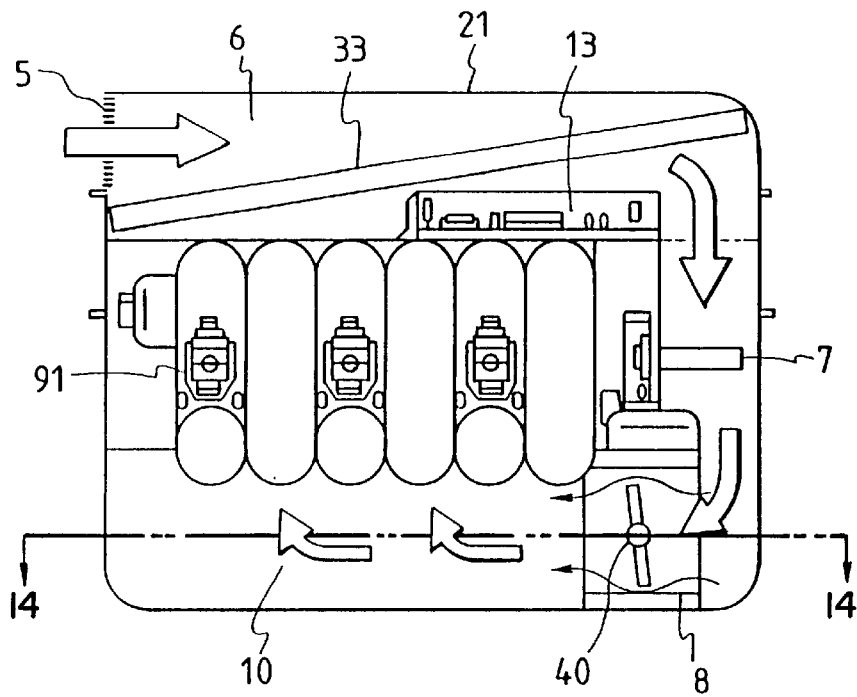
FIG. 13 is a sectional side view of a suction device according to a sixth preferred embodiment of the present invention.
Figure 14:
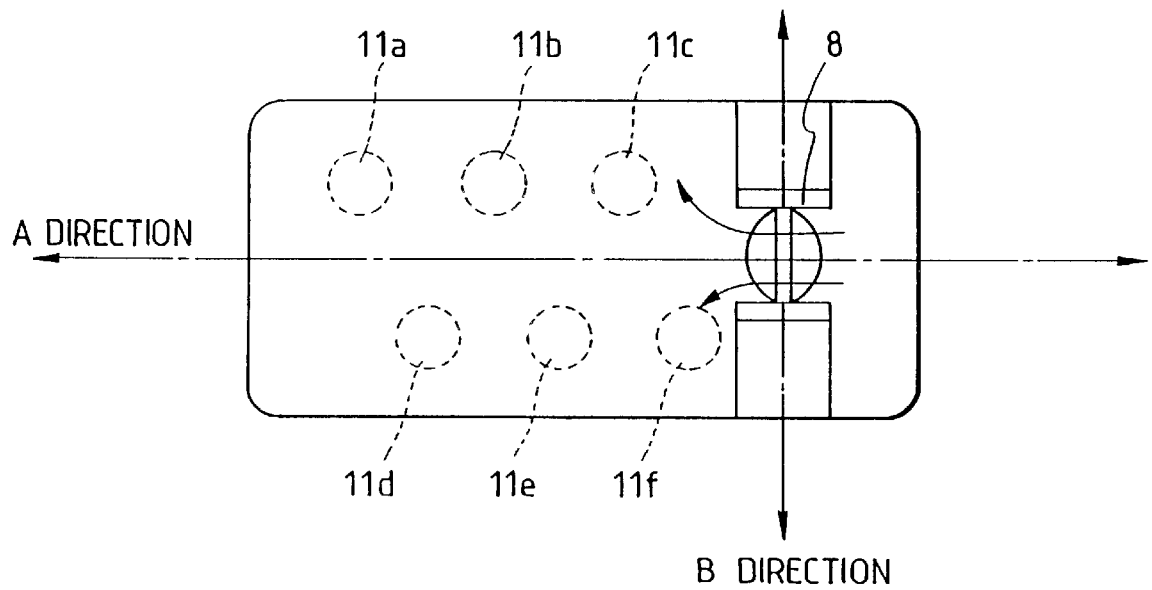
FIG. 14 is a cross section taken along the line C—C in FIG. 13.

A fifth preferred embodiment of the present invention is shown in FIG. 12. In this preferred embodiment, a circuit 32 of the suction air quantity detecting means 7 is located inside the control unit 13, thereby saving a space.

sixth preferred embodiment of the present invention is shown in FIGS. 13 and 14. FIG. 14 is a cross section taken along the line C—C in FIG. 13. Referring to FIG. 14, reference numerals 11a, 11b, and 11c denote individual suction pipes extending along a left bank of an internal combustion engine, and reference numerals 11d, 11e, and 11f denote individual suction pipes extending along a right bank of the internal combustion engine. The individual suction pipes 11a, 11b, and 11c are arranged in a direction A, and the individual suction pipes 11d, 11e, and 11f are also arranged in the direction A. The throttle valve 8 lies on a line of symmetry between the arrangement of the individual suction pipes 11a to 11c and the arrangement of the individual suction pipes 11d to 11f. Further, a throttle shaft of the throttle valve 8 extends in a direction B perpendicular to the direction A. This arrangement of the throttle valve 8 is important because the throttle valve 8 is located adjacent to the collector 10. With this arrangement, the throttle valve 8 is rotated to equally open to the left arrangement of the individual suction pipes 11a to 11c and the right arrangement of the individual suction pipes 11d to 11f, thereby effecting uniform distribution of air to the left and right arrangements.

Figure 15:
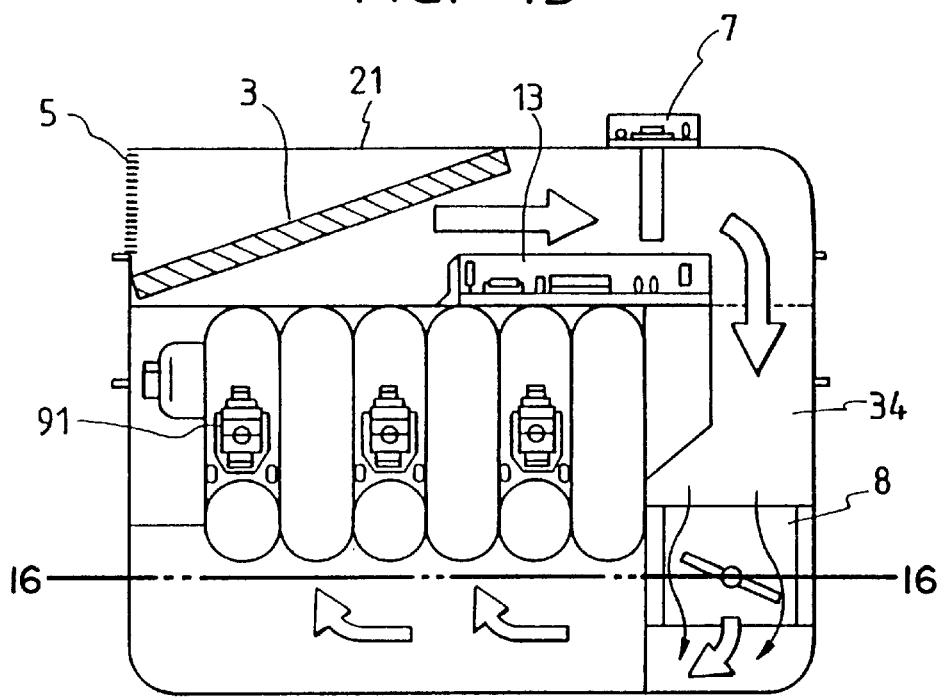
FIG. 15 is a sectional side view of a suction device according to a seventh preferred embodiment of the present invention.
Figure 16:
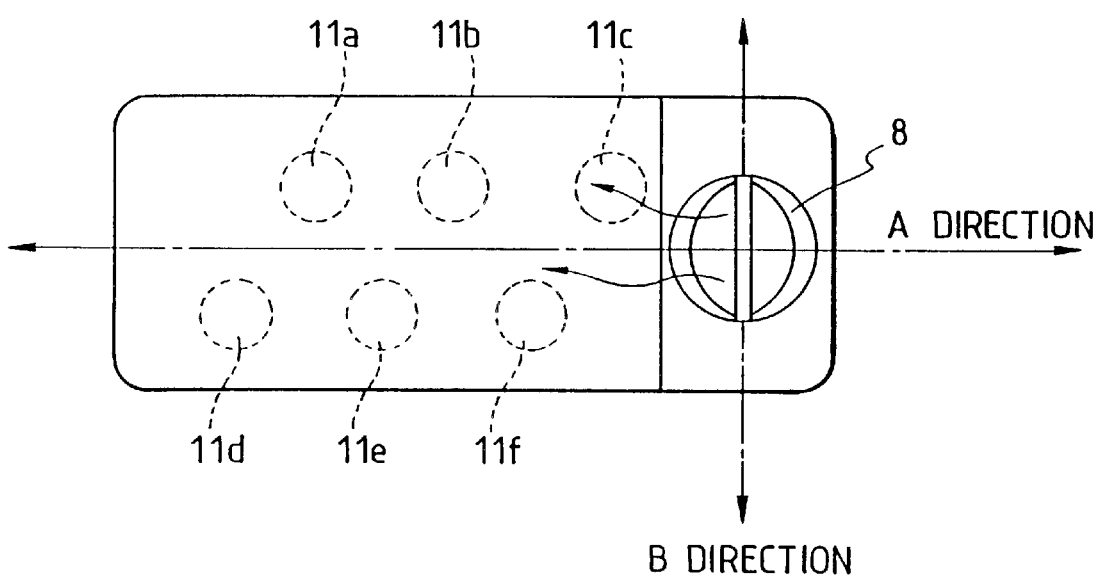
FIG. 16 is a cross section taken along the line C—C in FIG. 15.

A seventh preferred embodiment of the present invention is shown in FIGS. 15 and 16. FIG. 16 is a cross section taken along the line C—C in FIG. 15. In this preferred Embodiment, the throttle valve 8 is mounted in a vertical passage 34. As similar to the sixth preferred embodiment shown in FIGS. 13 and 14, the throttle shaft of the throttle valve 8 extends in a direction B perpendicular to a direction A of arrangement of individual suction pipes 11a to 11c or arrangement of individual suction pipes 11d to 11f. Accordingly, uniform distribution of air to both arrangements can be effected.

Figure 17:
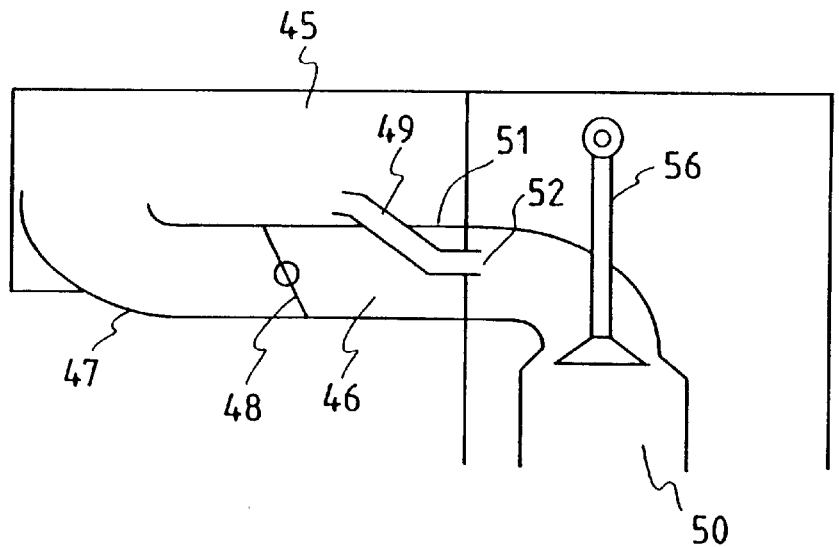
FIG. 17 is a schematic side view illustrating a swirl passage provided in a suction device according to an eighth preferred embodiment of the present invention.

An eighth preferred embodiment of the present invention is shown in FIGS. 17 to 24. FIG. 17 schematically shows a mechanism for forming a swirl of air in a combustion chamber 50 of an internal combustion engine. A suction port 46 as a downstream end portion of an individual suction pipe 47 is arranged adjacent to a collector 45 downstream of a throttle valve (not shown) through a partition 51 in consideration of space saving. A suction passage (swirl passage) 49 is formed so as to connect the collector 45 through the partition 51 to the suction port 46. Further, a swirl control valve 48 is located in the individual suction pipe 47 between the collector 45 and an outlet 52 of the suction passage 49. When a the swirl control valve 48 is closed, a suction air is allowed to flow through the suction passage 49, whereas when the swirl control valve 48 is opened, the suction air is allowed to flow through the individual suction pipe 47. With this arrangement, the suction passage 49 can be easily formed because the collector 45 and the individual suction pipe 47 are adjacent to each other through the partition 51.

Figure 18:
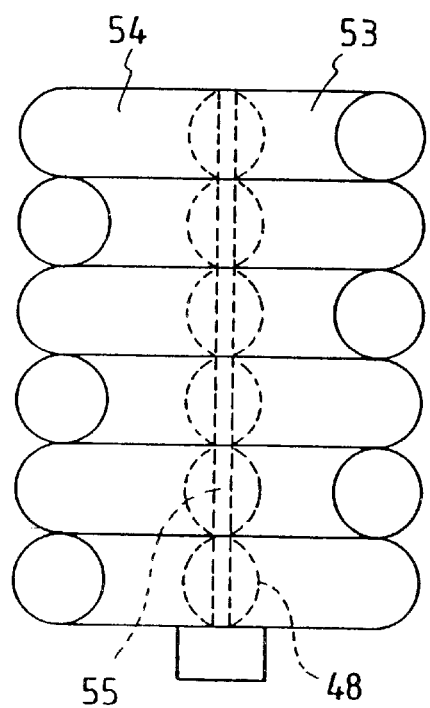
FIG. 18 is a schematic plan view illustrating swirl control valves provided in the suction device according to the eighth preferred embodiment.
Figure 19:
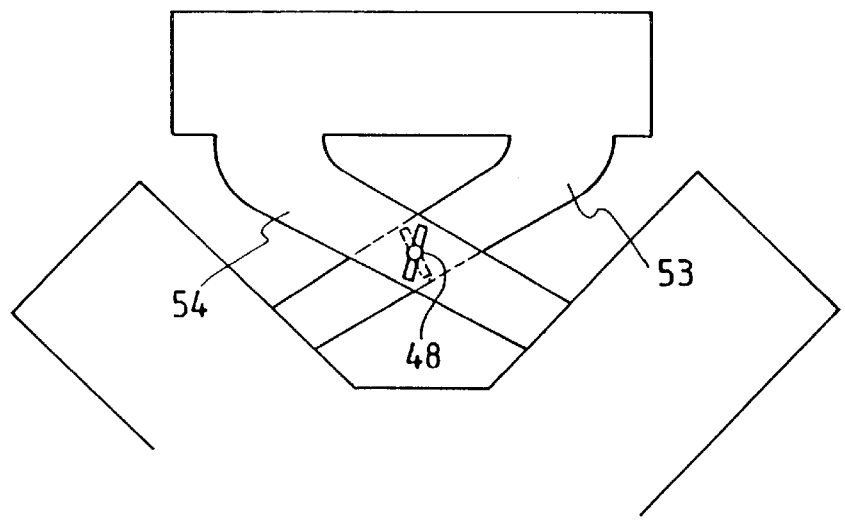
FIG. 19 is a schematic front view illustrating the swirl control valves shown in FIG. 18.
Figure 20:
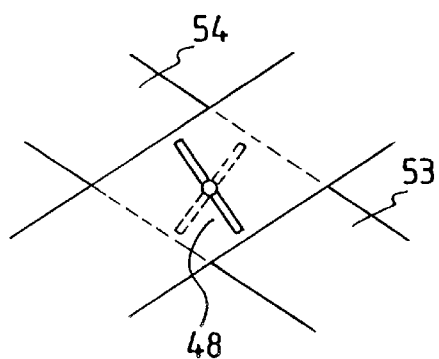
FIG. 20 is an enlarged view of an essential part shown in FIG. 19.
Figure 21:
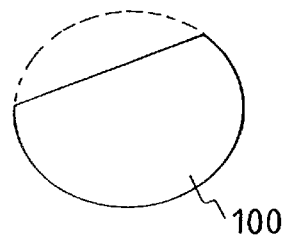
FIG. 21 is an enlarged view of a modification of each swirl control valve in the eighth preferred embodiment.

FIGS. 18 to 21 show a modified arrangement of plural swirl control valves 48 applied to a V-type internal combustion engine. As shown in FIGS. 18 to 20, a plurality of individual suction pipes 53 and 54 of the V-type internal combustion engine are alternately arranged so as to intersect each other at an intermediate portion in a space between right and left banks of the engine. The swirl control valves 48 are located in the individual suction pipes 53 and 54 at this intermediate portion, and are supported on a common shaft 55. If two or more support shafts for the swirl control valves 48 were provided, an increased space would become necessary to cause an increase in cost. As shown in FIG. 21, each swirl control valve 48 may be formed as a swirl control valve 100 partially cut away as shown by a dashed line. Further, in the case where each suction port has two main passages, each swirl control valve may be formed as a swirl control valve partially cut away so as to close one of the two main passages.

Figure 22:
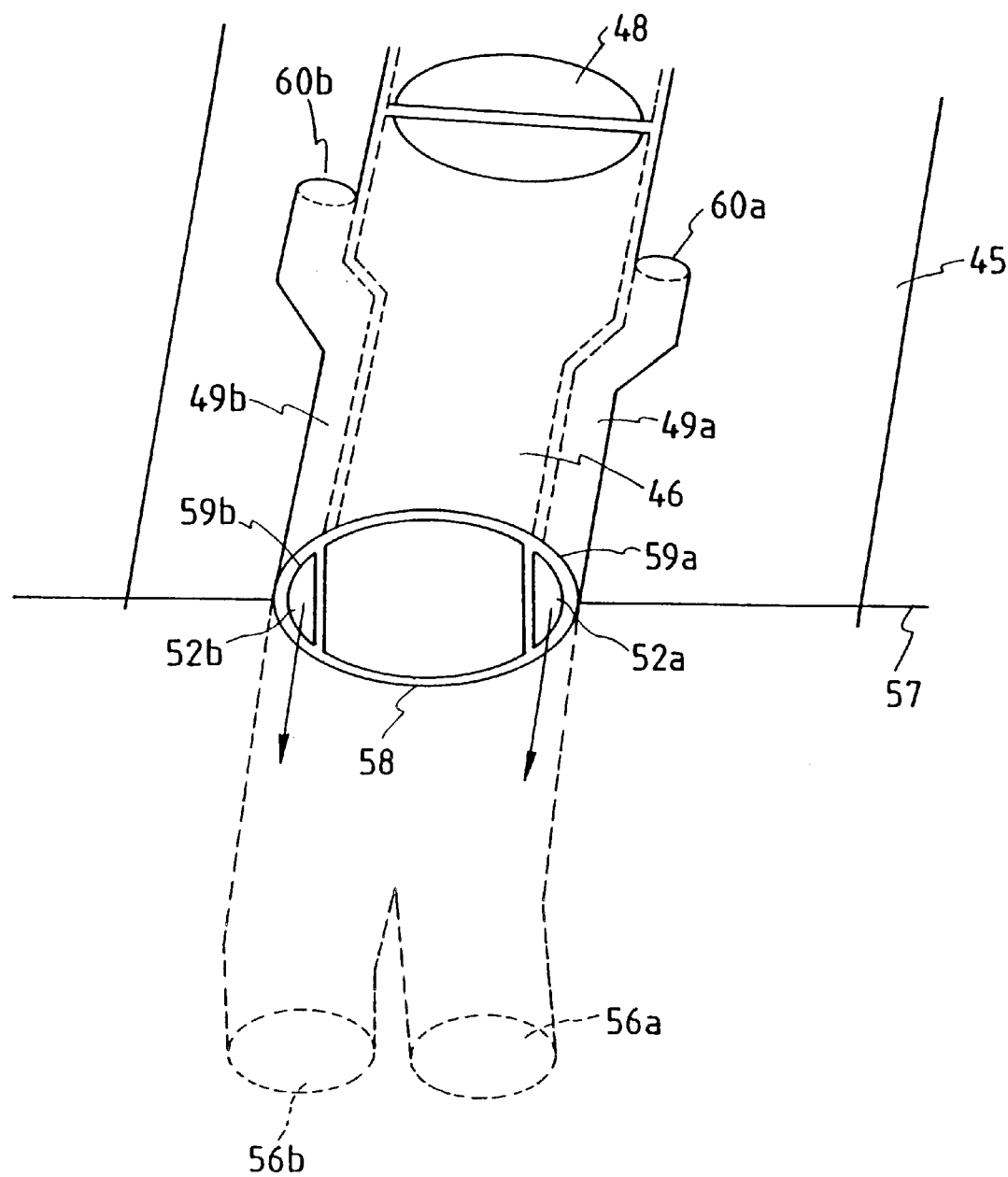
FIG. 22 is a schematic perspective view illustrating a preferred embodiment of the swirl passage shown in FIG. 17.

FIG. 22 shows a preferred embodiment of the suction passage 49. In FIG. 22, reference numerals 56a and 56b denote two suction valves provided in each cylinder of an internal combustion engine, and reference numeral 57 denotes a surface of connection between the individual suction pipes 47 and an engine head. Two suction passages (swirl passages) 49a and 49b communicating the collector 45 to the suction port 46 are formed on an outer wall surface of each individual suction pipe 47. That is, the walls of the suction passages 49a and 49b are partially formed by parts 59a and 59b of the walls of the individual suction pipe 47. The suction passages 49a and 49b have respective outlets 52a and 52b opening toward the suction valves 56a and 56b, respectively.

Figure 23:
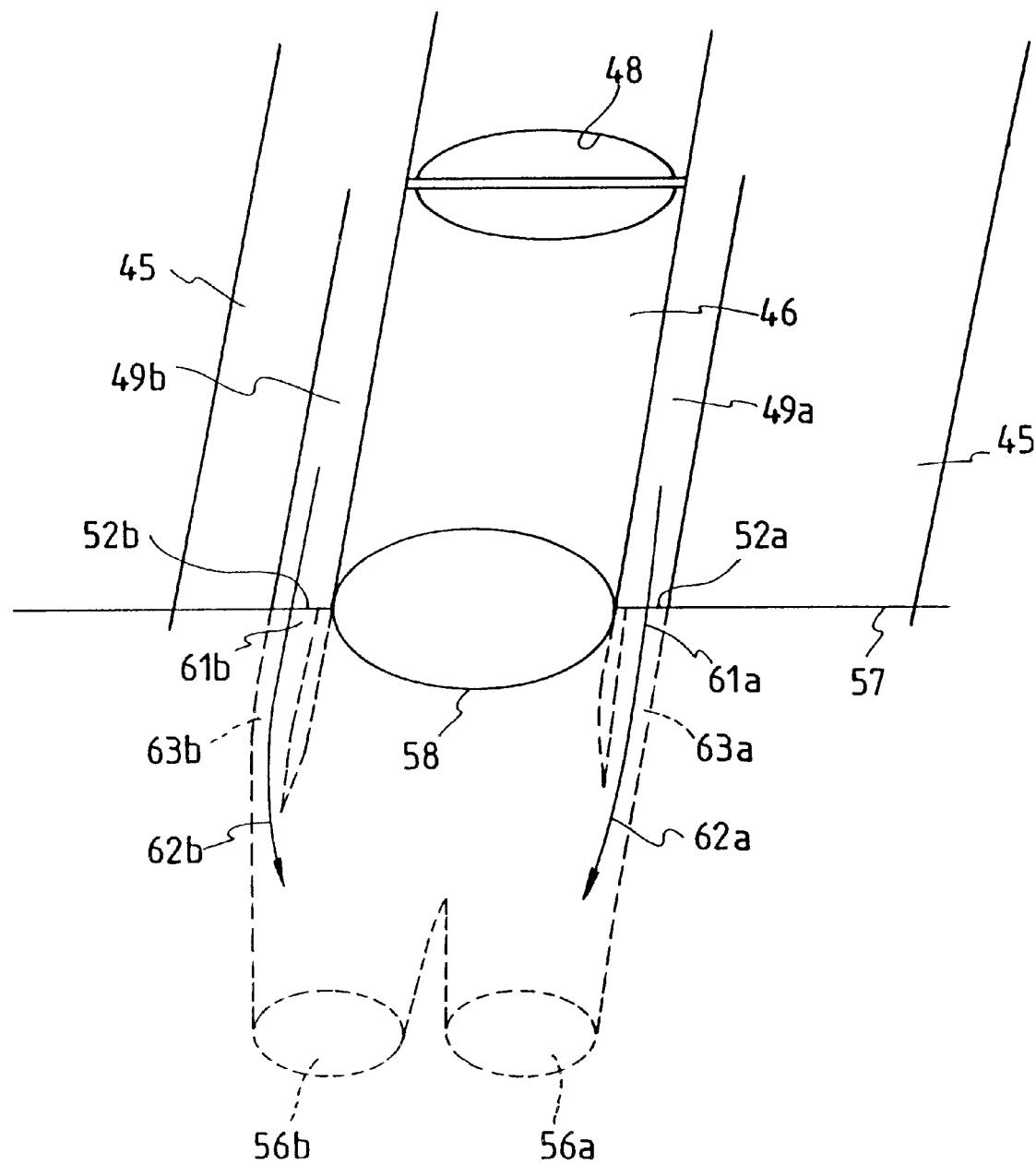
FIG. 23 is a schematic perspective view illustrating another preferred embodiment of the swirl passage shown in FIG. 17.

FIG. 23 shows another preferred embodiment of the suction passage 49. In this preferred embodiment, the outlets 52a and 52b of the suction passages 49a and 49b formed adjacent to each individual suction pipe 47 open to the connection surface 57 independently of an outlet of the suction port 46. The outlets 52a and 52b are respectively connected to inlets 61a and 61b of two suction passages (swirl passages) 63a and 63b formed in the engine head. Outlets 62a and 62b of the suction passages 63a and 63b open near the suction valves 56a and 56b, respectively. With this arrangement, a strong swirl can be easily formed in the combustion chamber.

Figure 24:
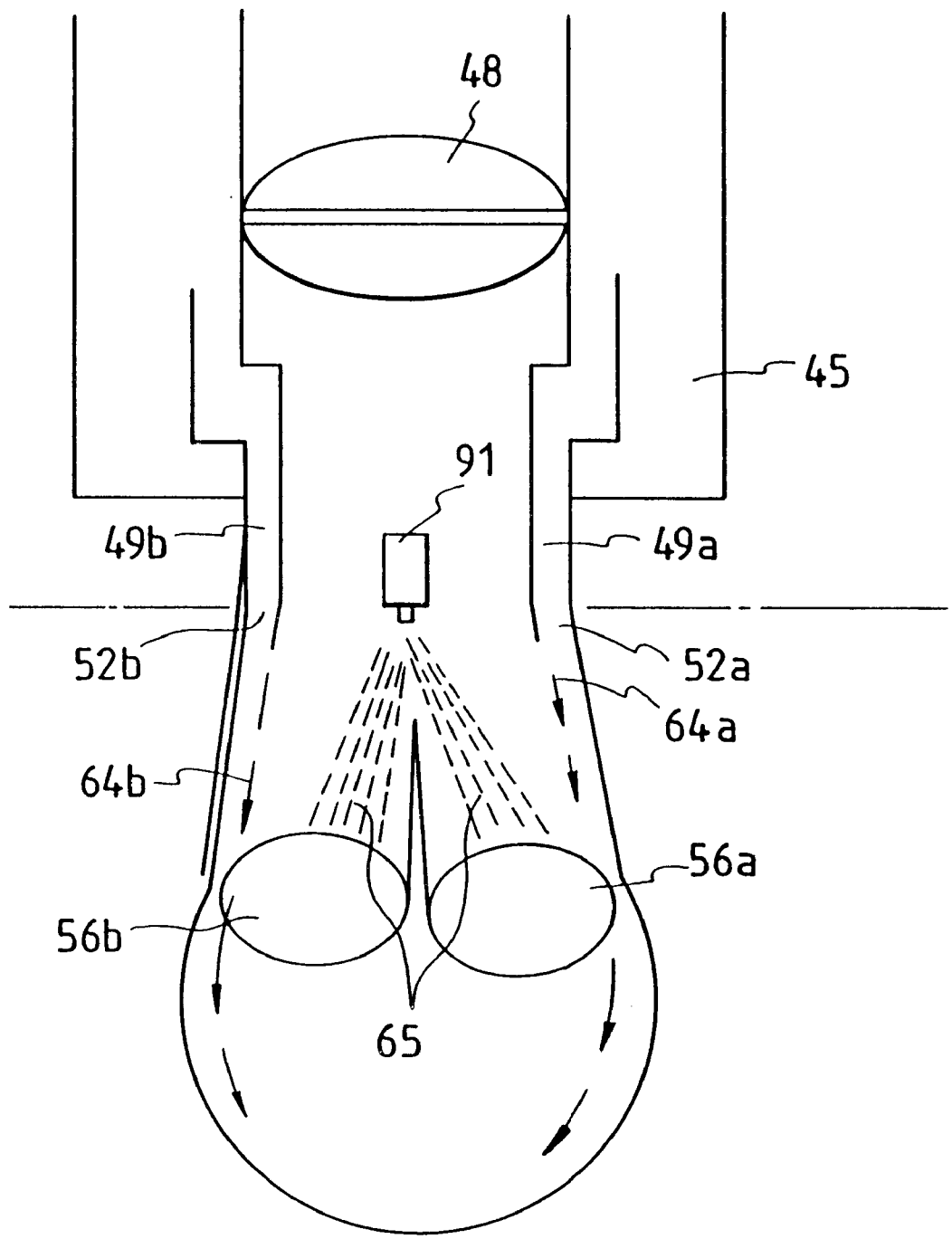
FIG. 24 is a schematic perspective view illustrating the flows of air and fuel in forming a swirl.

FIG. 24 shows the flows of air and fuel. Reference numerals 64a and 64b denote the flows of air blown from the suction passages 49a and 49b, respectively, and reference numeral 65 denotes the sprays of fuel injected from the fuel injection valve 91. The outlets 52a and 52b of the suction passages 49a and 49b are decided in direction so that the air flows 64a and 64b do not directly blow against the fuel sprays 65. If the air flows 64a and 64b having a high velocity blow directly against the fuel sprays 65, the fuel sprays 65 change their directions to strike against a wall surface of the suction passage in the engine head, so that the fuel sprays 65 do not properly enter the cylinder of the internal combustion engine. To avoid this problem, the nozzles of the fuel injection valve 91 are decided in direction so that the fuel sprays 65 may be directed to central portions of the suction valves 56a and 56b, and the outlets 52a and 52b of the suction passages 49a and 49b are decided in direction so that the air flows 64a and 64b may be directed to outside end portions of the suction valves 56a and 56b. Also in the case of a single suction valve per cylinder, a fuel spray from a fuel injection valve is directed to a central portion of the suction valve, and an air flow from the suction passage 49 is directed to an outer peripheral portion of the suction valve.

Figure 25:
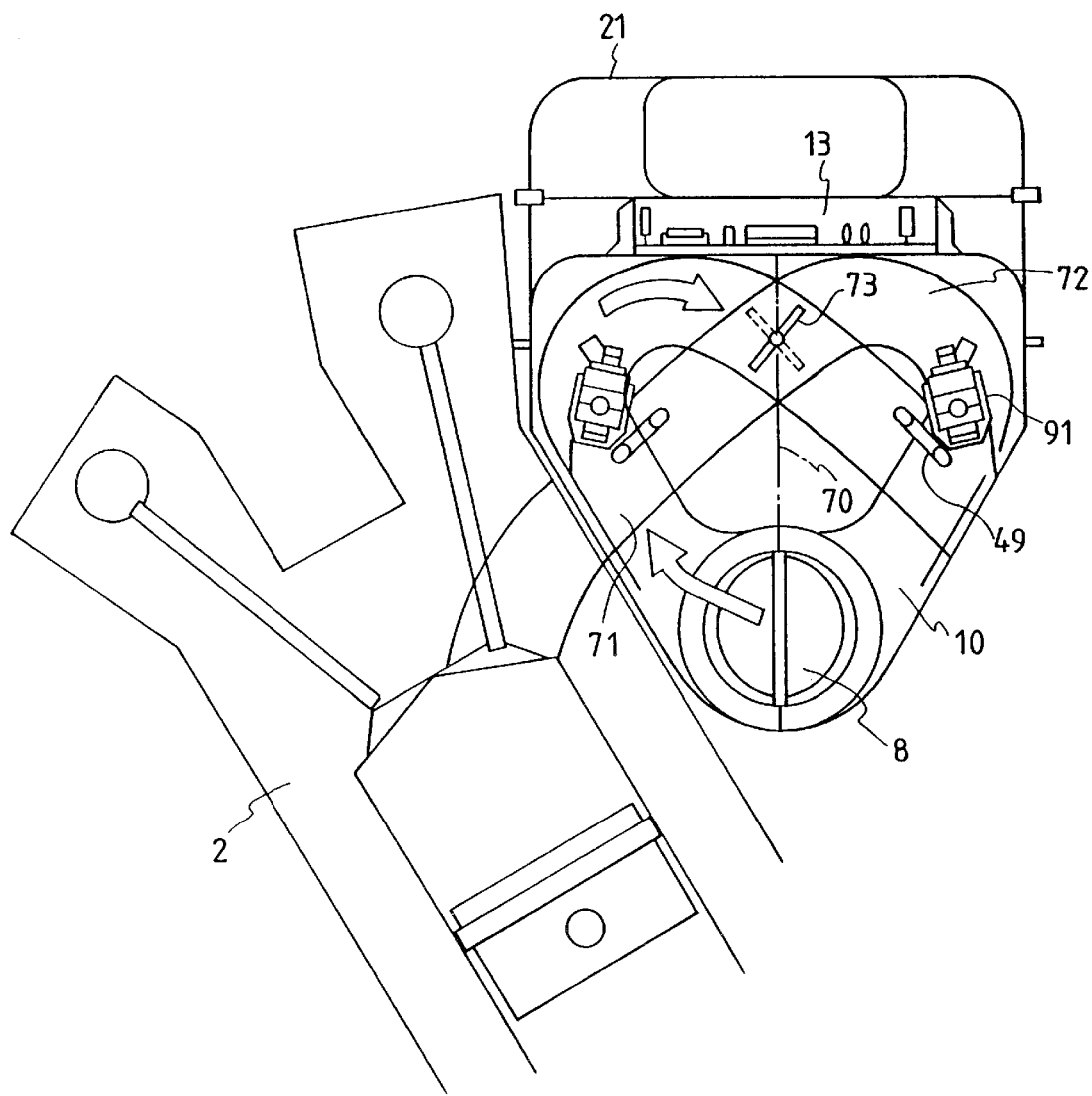
FIG. 25 is a sectional front view of a suction device according to a ninth preferred embodiment of the present invention.
Figure 26:
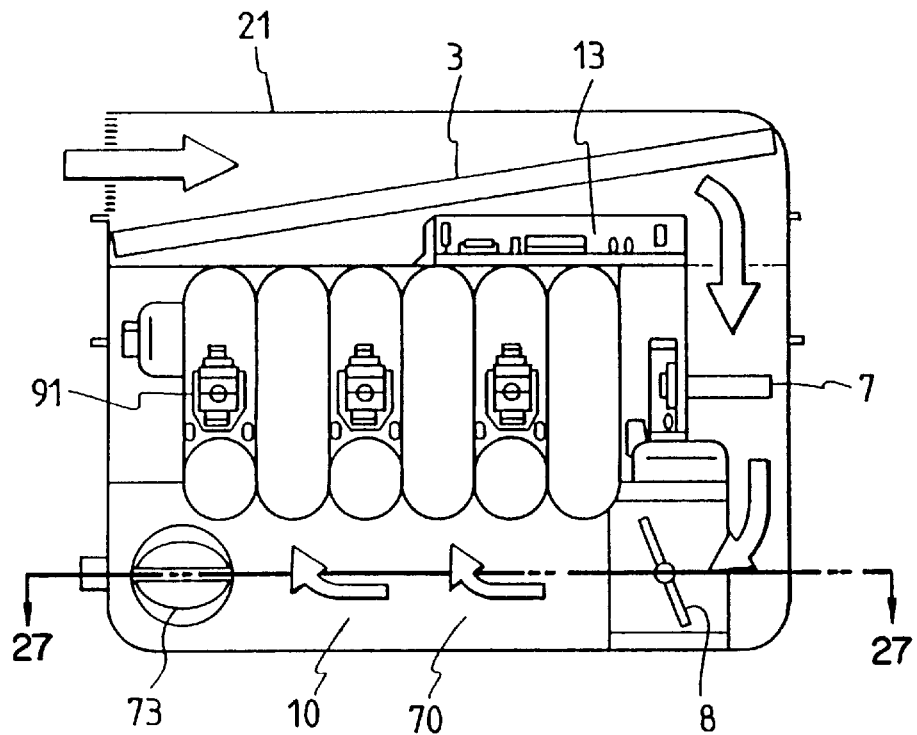
FIG. 26 is a sectional side view of the suction device shown in FIG. 25.
Figure 27:
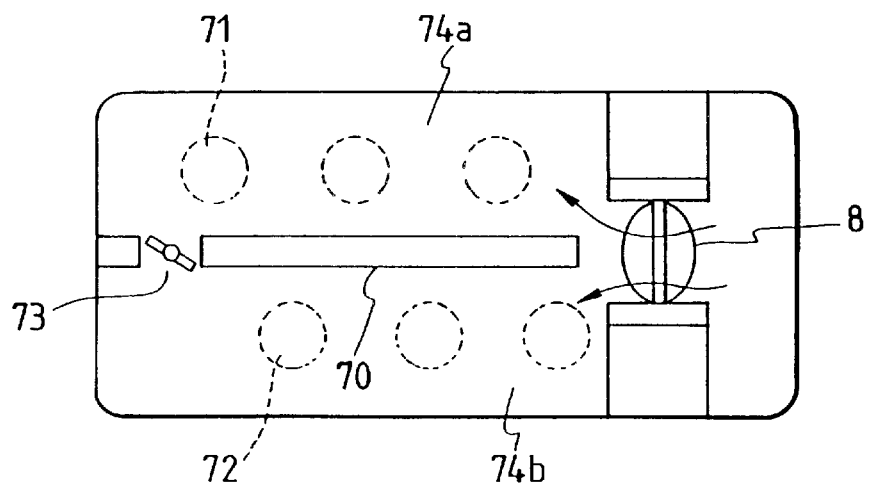
FIG. 27 is a cross section taken along the line C—C in FIG. 26.

A ninth preferred embodiment of the present invention is shown in FIGS. 25 to 27. FIG. 27 is a cross section taken along the line C—C in FIG. 26. In this preferred embodiment, a partition 70 is formed in the collector 10 at a transversely central position thereof to define left and right collectors 74a and 74b. Accordingly, the air passed through the throttle valve 8 is divided by the partition 70 to flow into the left and right collectors 74a and 74b. Further, a variable induction valve 73 is mounted on the partition 70 so as to communicate the left and right collectors 74a and 74b. The variable induction valve 73 is operated according to an operational condition of the engine, thereby changing a substantial suction length of an individual suction pipe 71 or 72. That is, when the variable induction valve 73 is closed in a low-speed condition of the engine, the substantial suction length can be made large, whereas when the variable induction valve 73 is opened in a high-speed condition of the engine, the substantial suction length can be made small.

Figure 28:
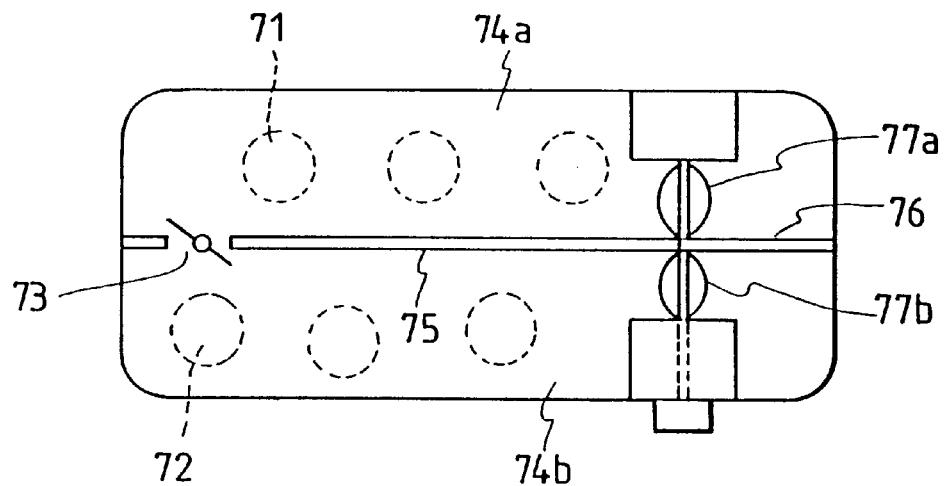
FIG. 28 is a view similar to FIG. 27, showing a tenth preferred embodiment of the present invention.

A tenth preferred embodiment of the present invention is shown in FIG. 28, which is a view similar to FIG. 27. In this preferred embodiment, a partition 75 separating the collector 10 into the left and right collectors 74a and 74b is extended rearwardly between two throttle valves 77a and 77b to a downstream position of a suction air quantity detecting means (not shown), which is located upstream of the throttle valves 77a and 77b. Thus, an extended partition 76 is formed between the throttle valves 77*a* and 77*b* and the suction ail quantity detecting means. That is, an air passage where the suction air quantity detecting means is located is formed as a single passage, but an air passage from the downstream of the detecting means through the throttle valves 77*a* and 77*b* to the collectors 74*a* and 74*b* is formed as dual separate passages. The variable induction valve 73 mounted on the partition 75 in this preferred embodiment is operated similarly to the ninth preferred embodiment shown in FIG. 27.

Figure 29:
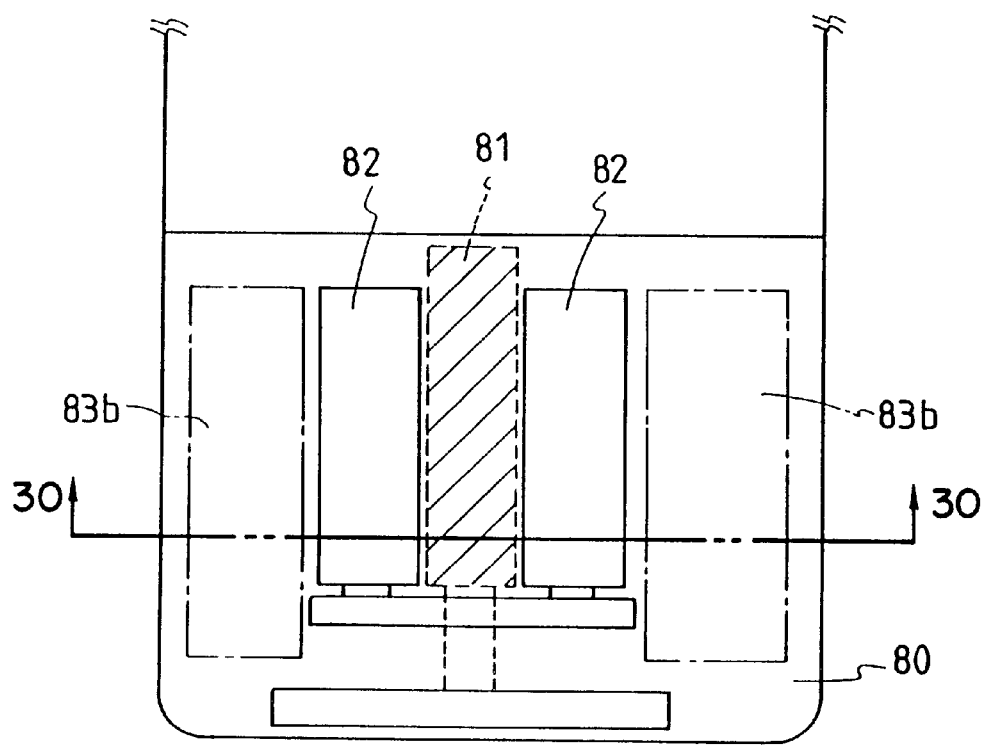
FIG. 29 is a top plan view illustrating a layout in an engine room of an automobile.
Figure 30:
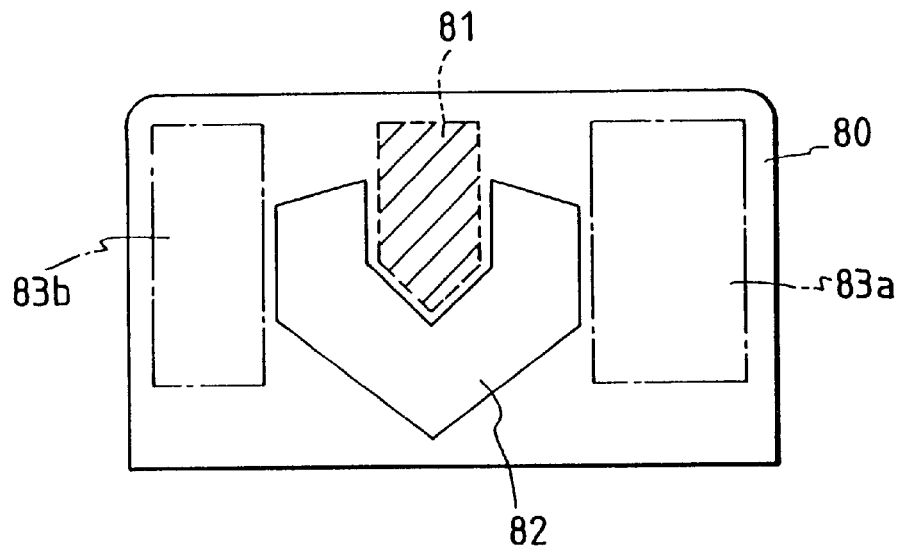
FIG. 30 is a cross section taken along the line X—X in FIG. 29.

FIGS. 29 and 30 schematically illustrate a layout in an engine room 80 of an automobile in which a suction device 81 according to the present invention is mounted. FIG. 30 is a cross section taken along the line X—X in FIG. 29. The suction device 81 is located in a space defined between left and right banks and of a V-type internal combustion engine 82. Reference numerals 83*a* and 83*b* denote spaces where an air cleaner, a throttle valve, etc. were conventionally located. In this preferred embodiment, since these elements are incorporated in the suction device 81, any other parts located in the spaces 83*a* and 83*b* can be easily maintained or inspected.

Figure 31:
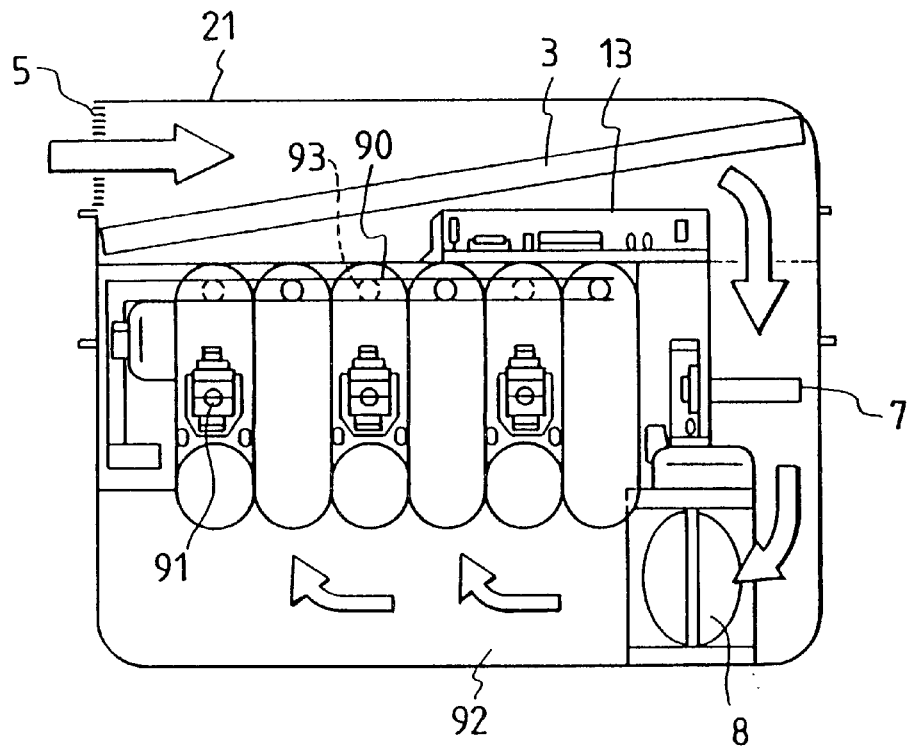
FIG. 31 is a sectional side view of a suction device according to an eleventh preferred embodiment of the present invention.

An eleventh preferred embodiment of the present invention is shown in FIG. 31. In this preferred embodiment, an EGR (exhaust gas recirculation) passage 90 is provided in the suction device 21 so that outlets 93 of the EGR passage 90 respectively open into the individual suction pipes at positions downstream of the fuel injection valves 91. If an EGR device is provided in a collector 90 as in the prior art, the fuel injection valves 91 located downstream of the collector 90 are stained by an EGR gas. To avoid this problem, the outlets 93 of the EGR passage 90 in this preferred embodiment open downstream of the fuel injection valves 91 to thereby prevent the stain of the valves 91 by the EGR gas.

Figure 32:
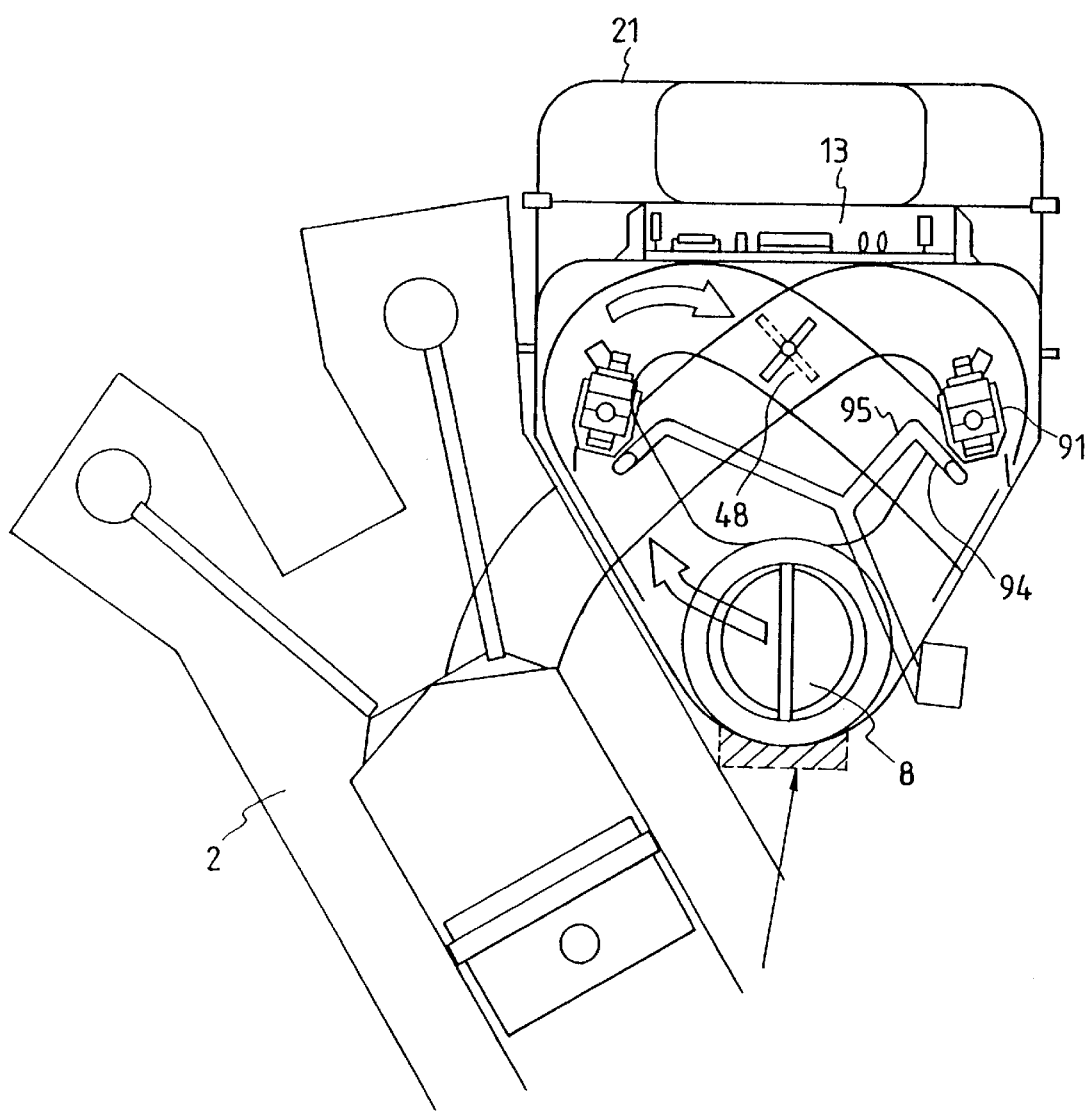
FIG. 32 is a sectional front view of a suction device according to a twelfth preferred embodiment of the present invention.

A twelfth preferred embodiment of the present invention is shown in FIG. 32. In this preferred embodiment, an EGR passage 95 is connected to a swirl passage 94 for forming a swirl of air in the combustion chamber of the internal combustion engine. With this arrangement, a suction air from the swirl passage 94 and an EGR gas from the EGR passage 95 can be uniformly mixed in the combustion chamber.

Figure 33:
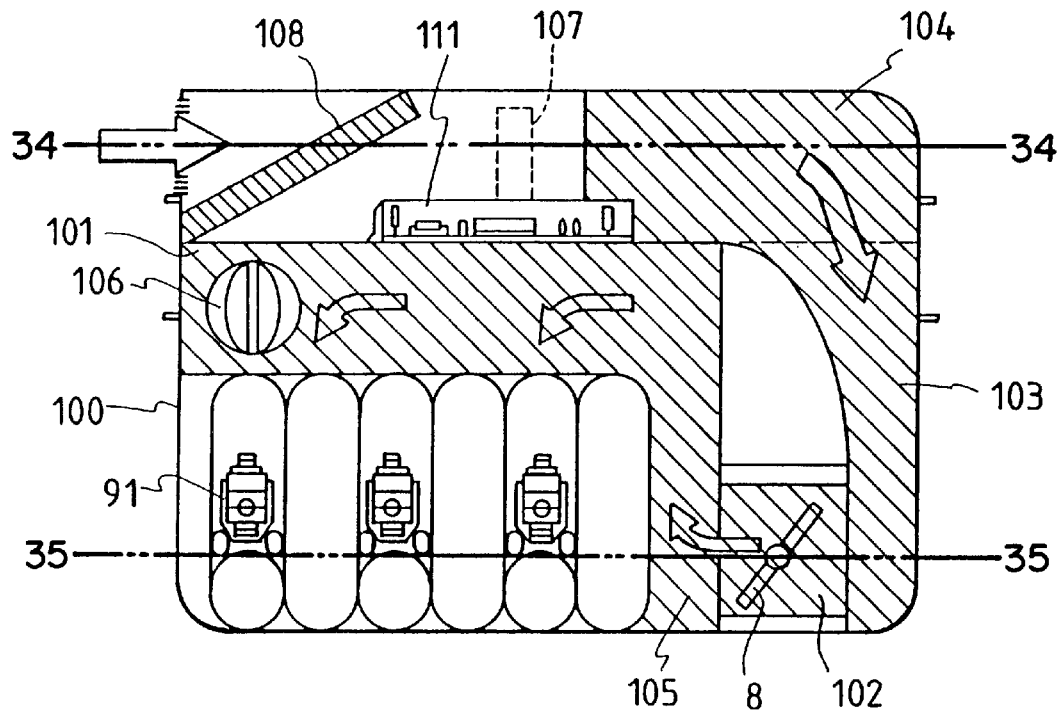
FIG. 33 is a sectional side view of a suction device according to a thirteenth preferred embodiment of the present invention.
Figure 34:
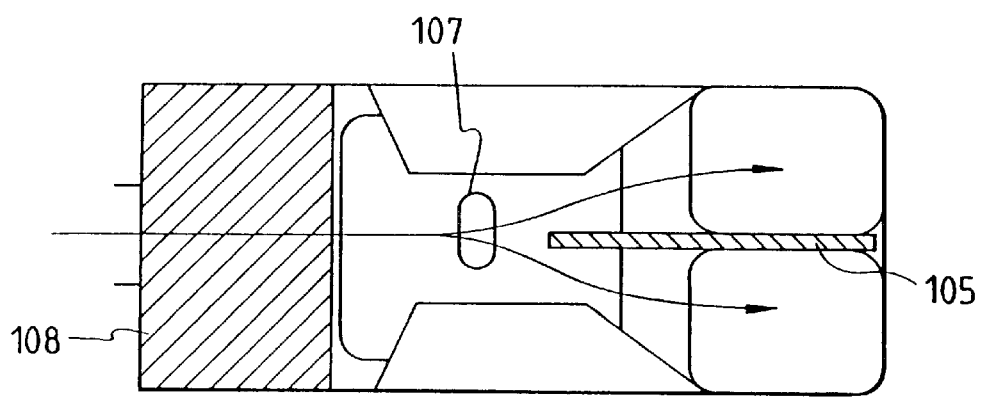
FIG. 34 is a cross section taken along the line B—B in FIG. 33.
Figure 35:
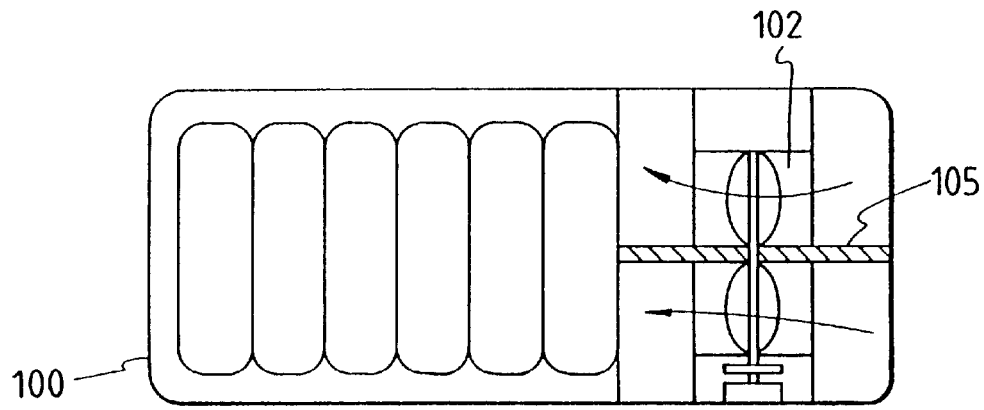
FIG. 35 is a cross section taken along the line A—A in FIG. 33.

A thirteenth preferred embodiment of the present invention is shown in FIGS. 33 to 37. FIG. 34 is a cross section taken along the line B—B in FIG. 33, and FIG. 35 is a cross section taken along the line A—A in FIG. 33. A partition 105 for equally dividing an air passage in a suction device 100 into right and left areas is provided in a collector 101, a throttle portion 102 in which the throttle valve 8 is located, a vertical passage 103, and an upper horizontal passage 104. Further, a variable induction valve 106 is mounted on the partition 105 so as to communicate the right and left portions of the collector 101. In the upper horizontal passage 104, the partition 105 extends from the rear end of the passage 104 to the downstream of an air flow meter 107. The air flow meter 107 is located in a single air passage, and an air cleaner element 108 is located upstream of the air flow meter 107 in this single air passage. The purpose of provision of the partition 105 is to obtain a supercharging effect. That is, when the variable induction valve 106 is closed, the supercharging effect can be obtained in a low-speed condition of an internal combustion engine, whereas when the variable induction valve 106 is opened, an effective point of the supercharging effect is shifted to a high-speed region of operation of the engine.

Figure 36:
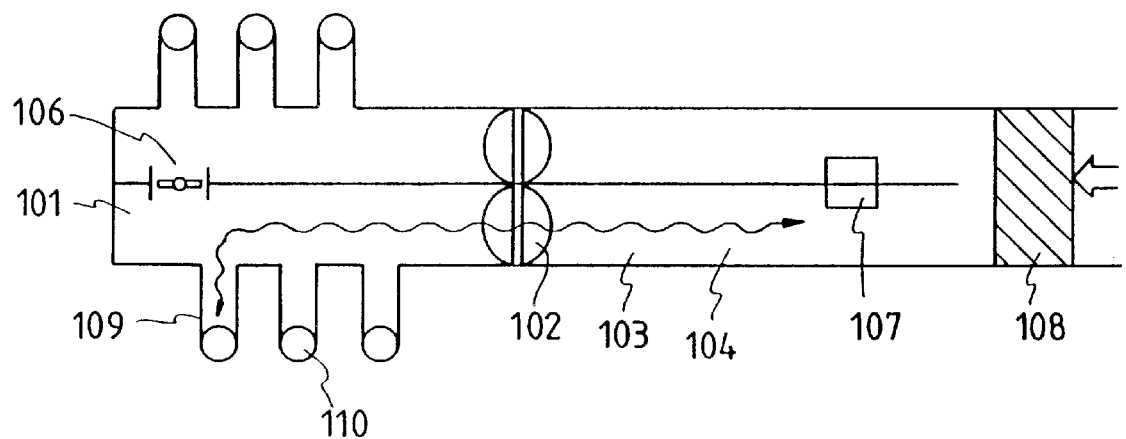
FIG. 36 is a schematic diagram illustrating a resonance suction length in the suction device shown in FIG. 33 when a variable induction valve is closed.
Figure 37:
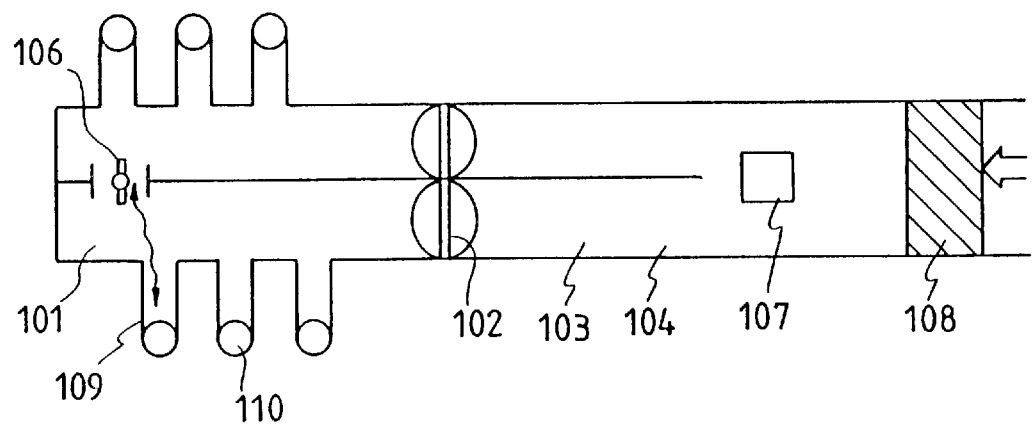
FIG. 37 is a diagram similar to FIG. 36, when the variable induction valve is opened.

This effect will be described in detail with reference to FIGS. 36 and 37. In these drawings, reference numeral 110 denotes a cylinder of the internal combustion engine, and reference numeral 109 denotes an individual suction pipe of the suction device 100. FIG. 36 shows a closed condition of the variable induction valve 106. In this closed condition, a resonance suction length participating the supercharging is the total length of the individual suction pipe 109, the collector 101, the throttle portion 102, the vertical passage 103, and the upper horizontal passage 104, which length is a considerably large length. Accordingly, a resonance frequency is low, and a resonance effect occurs in a low-speed condition of the engine. On the other hand, when the variable induction valve 106 is opened as shown in FIG. 37, the resonance suction length becomes the length of the individual suction pipe 109 plus the distance from it to the variable induction valve 106. Thus, the resonance suction length is shortened, and the resonance effect therefore occurs in a high-speed condition of the engine. In this manner, the resonance suction length can be changed by opening and closing the variable induction valve 106 to thereby obtain a resonance supercharging effect in a wide operational region of the engine.

Figure 38:
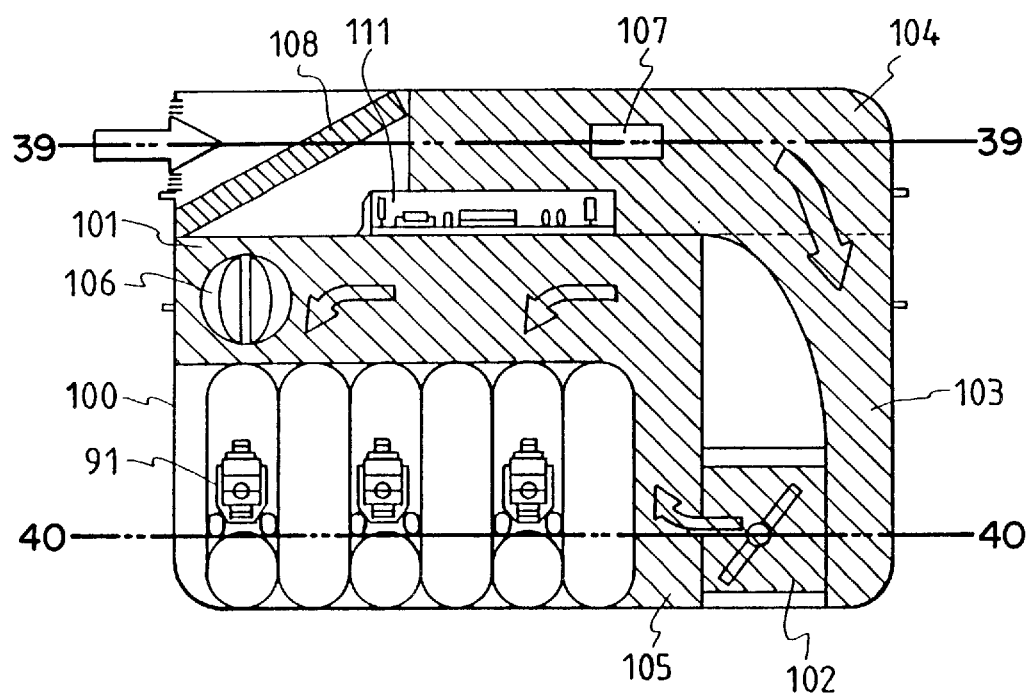
FIG. 38 is a sectional side view of a suction device according to a fourteenth preferred embodiment of the present invention.
Figure 39:
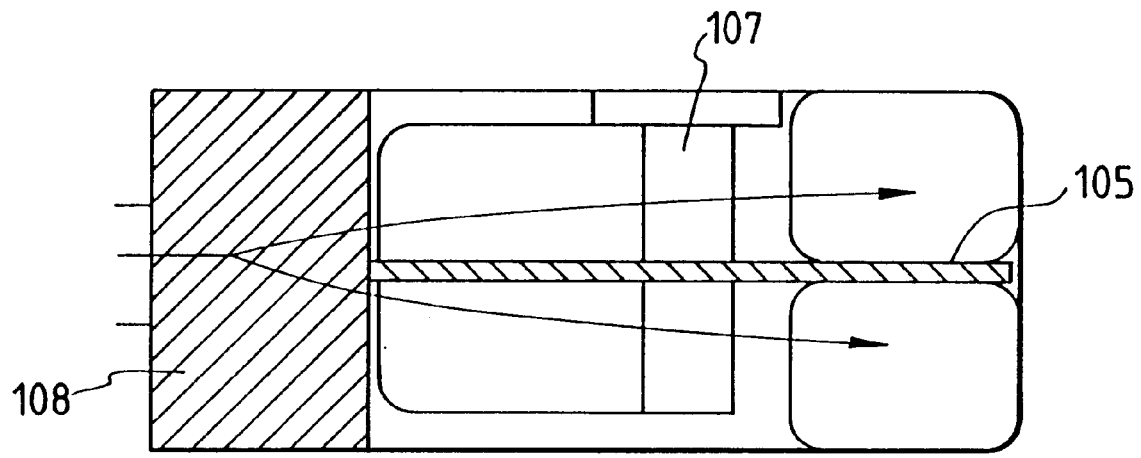
FIG. 39 is a cross section taken along the line B—B in FIG. 38.
Figure 40:
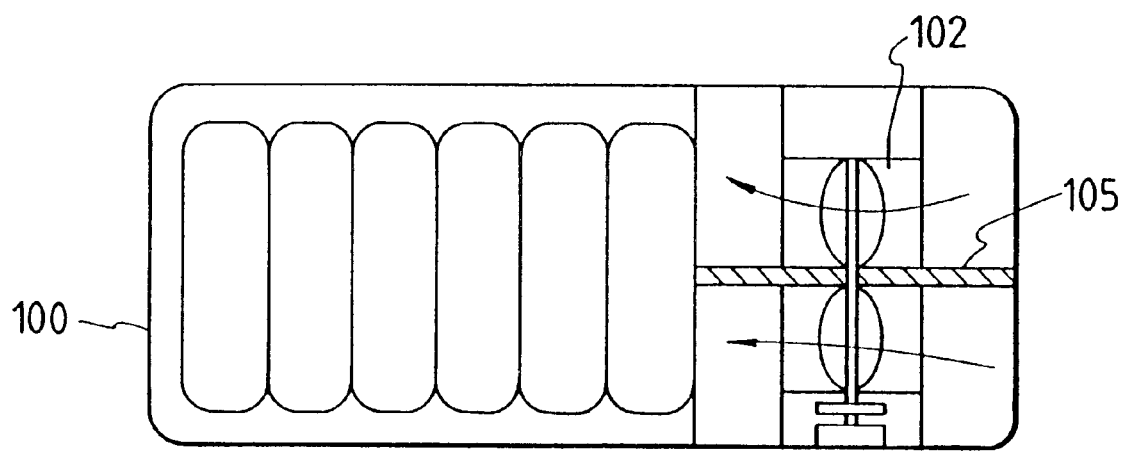
FIG. 40 is a cross section taken along the line A—A in FIG. 38.

A fourteenth preferred embodiment of the present invention is shown in FIGS. 38 to 45. FIG. 39 is a cross section taken along the line B—B in FIG. 38, and FIG. 40 is a cross section taken along the line A—A in FIG. 38. This preferred embodiment is similar to the thirteenth preferred embodiment with the exception that the partition 105 is extended to a position upstream of the air flow meter 107 and downstream of the air cleaner element 108 in the upper horizontal passage 104. Accordingly, the air flow meter 107 is provided so as to pass through the partition 105 and extend across the upper horizontal passage 104. When the variable induction valve 106 is closed, the suction length can be made larger than that in the thirteenth preferred embodiment shown in FIG. 33. A control unit 111 is located in the upper horizontal passage 104, so as to be cooled by an air flow.

Figure 41:
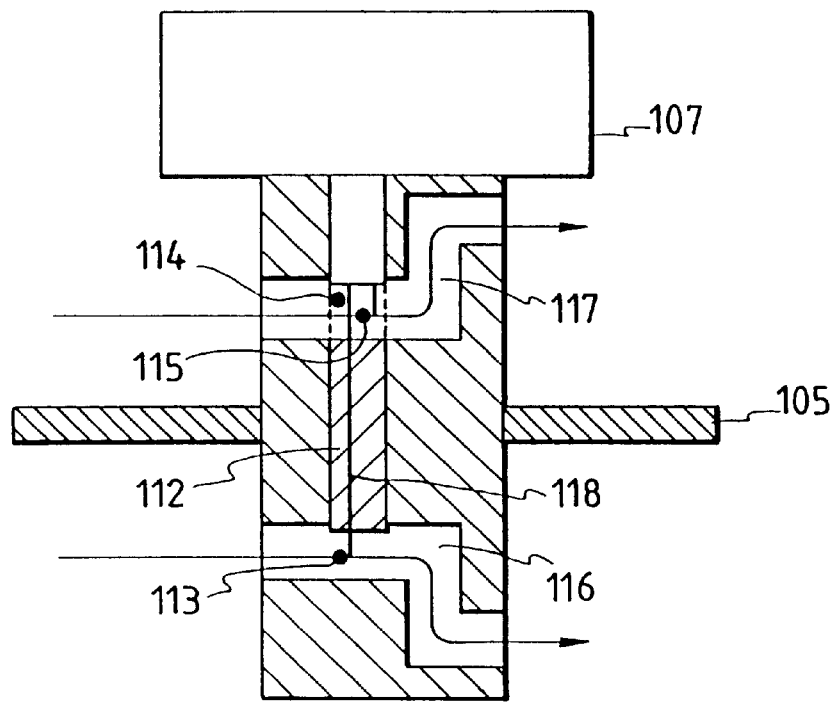
FIG. 41 is a horizontal sectional view of a preferred embodiment of an air flow meter shown in FIG. 38.
Figure 42:
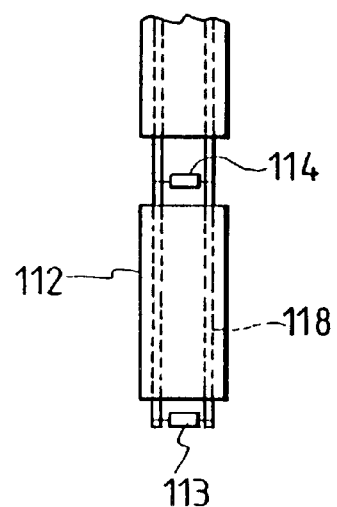
FIG. 42 is a left side view of the air flow meter shown in FIG. 41.
Figure 43:
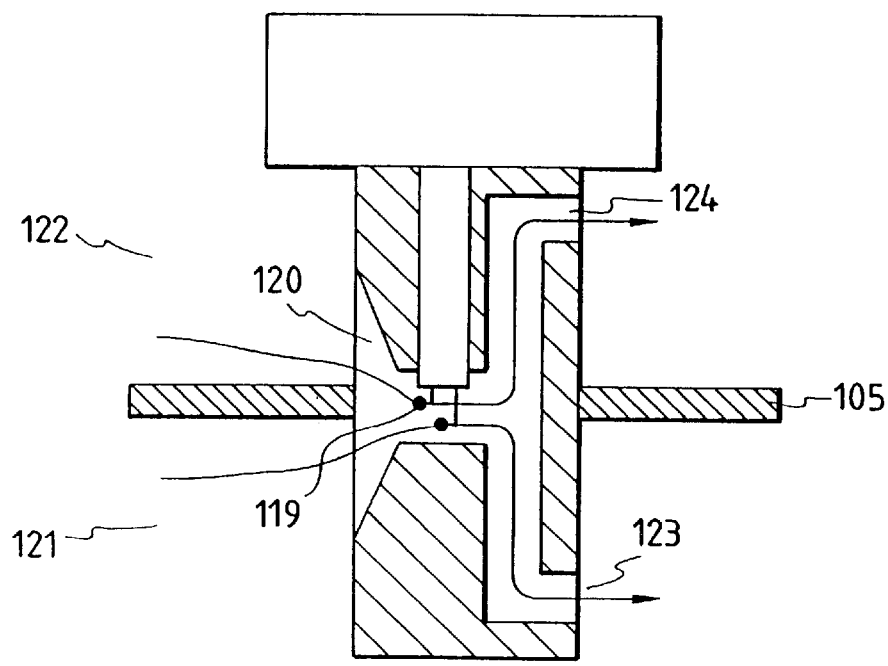
FIG. 43 is a view similar to FIG. 41, showing another preferred embodiment of the air flow meter.
Figure 44:
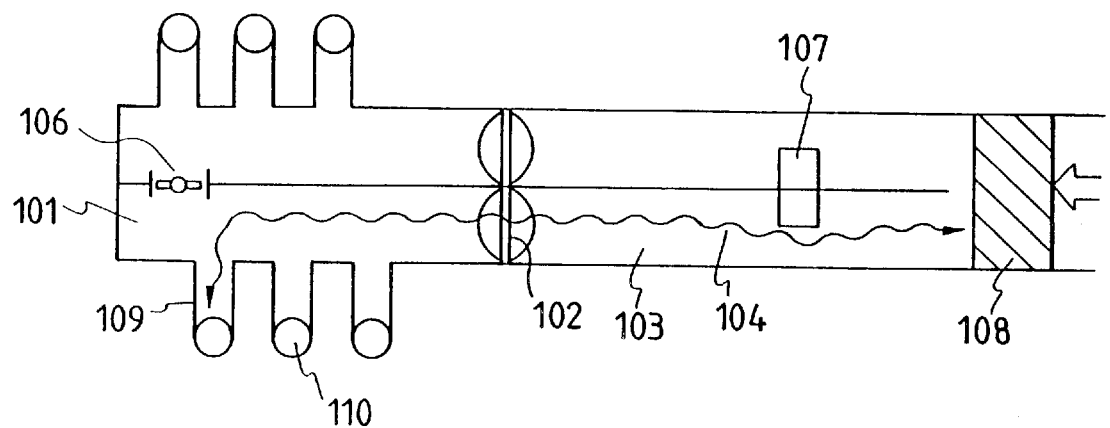
FIG. 44 is a schematic diagram illustrating a resonance suction length in the suction device shown in FIG. 38 when a variable induction valve is closed.
Figure 45:
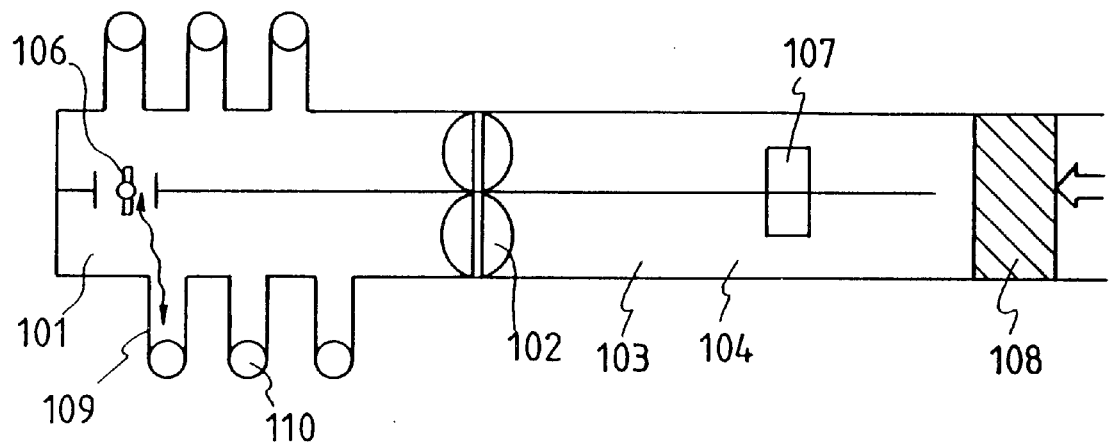
FIG. 45 is a diagram similar to FIG. 44, when the variable induction valve is opened.
Figure 46:
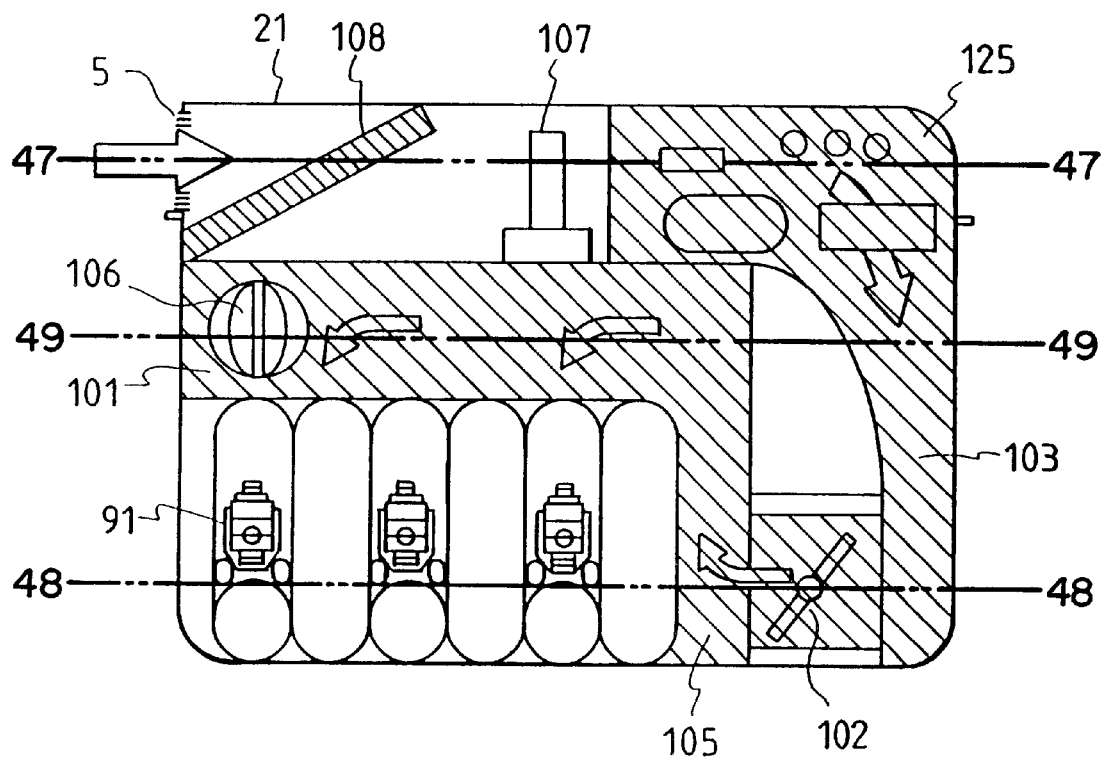
FIG. 46 is a sectional side view of a suction device according to a fifteenth preferred embodiment of the present invention.

In this preferred embodiment, the air flow meter 107 is so designed as to measure the quantities of air flows in two air passages 121 and 122 separated by the partition 105. FIGS. 41 and 42 show a preferred embodiment of the air flow meter 107. FIG. 42 is a cross section taken along the line A—A in FIG. 41. As shown in FIGS. 41 and 42, lead wires 118 are embedded in a probe 112, and two hot wires 113 and 114 are connected to the lead wires 118. The two hot wires 113 and 114 are located in two air passages 116 and 117 respectively communicating with the two air passages 121 and 122 separated by the partition 105. Accordingly, the velocities of air flows in the two air passages 121 and 122 can be measured by the hot wires 113 and 114, respectively. Then, an average of the velocities thus measured is calculated to thereby detect the quantity of suction air sucked into the internal combustion engine. Reference numeral 115 denotes a resistor for compensating a suction air temperature. The resistor 115 is located in the air passage 117 in this preferred embodiment; however, it may be located in the air passage 116. FIG. 43 is another preferred embodiment of the air flow meter 107. In this preferred embodiment, the air flow meter 107 has a common air inlet 120 equally exposed to the two air passages 121 and 122 separated by the partition 105, and has two air outlets 123 and 124 respectively opening to the two air passages 121 and 122. Further, a single hot wire 119 is located in a common air passage formed just downstream of the air inlet 120. With this arrangement, an average velocity of air flows in the two air passages 121 and 122 can be measured by the hot wire 119. FIGS. 44 and 45 schematically illustrate a resonance supercharging effect in the fourteenth preferred embodiment shown in FIG. 38. FIG. 44 shows a closed condition of the variable induction valve 106. In this closed condition, the resonance suction length is a total distance from the individual suction pipe 109 to the upstream of the air flow meter 107. Accordingly, the resonance suction length in this preferred embodiment can be made larger than that in the thirteenth preferred embodiment shown in FIG. 36, so that an engine speed at which the resonance supercharging effect occurs can be shifted to a lower point as compared with the embodiment shown in FIG. 36. On the other hand, when the variable induction valve 106 is opened as shown in FIG. 45, the resonance suction length is shortened as shown by a wavy line as similar to the embodiment shown in FIG. 37. Thus, an engine speed range where the resonance supercharging effect occurs can be more widened as compared with the embodiment shown in FIGS. 36 and 37.

Figure 47:
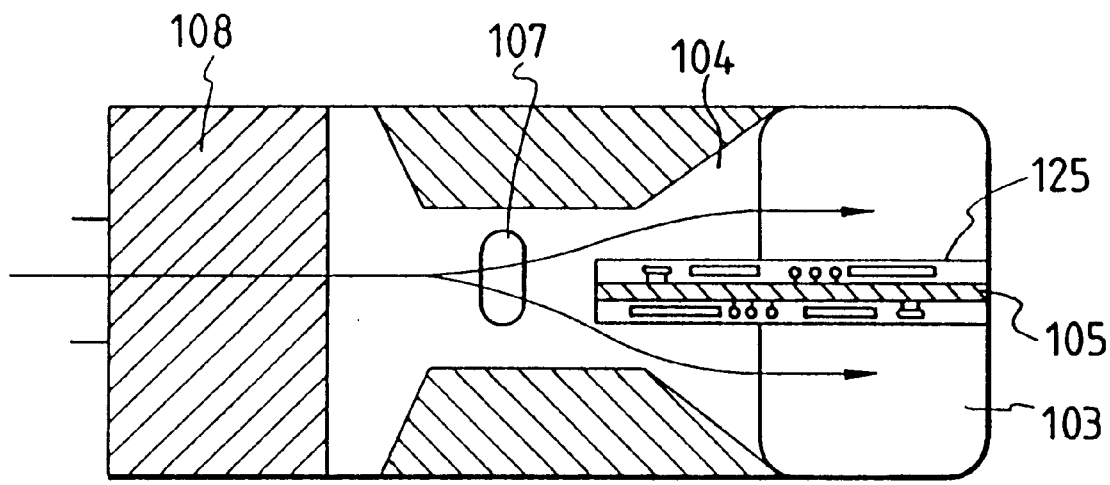
FIG. 47 is a cross section taken along the line C—C in FIG. 46.
Figure 48:
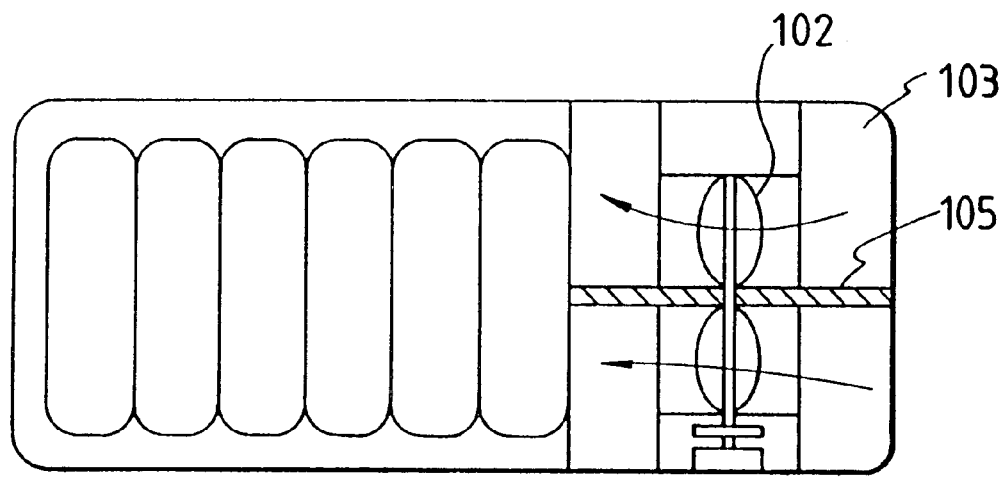
FIG. 48 is a cross section taken along the line A—A in FIG. 46.
Figure 49:
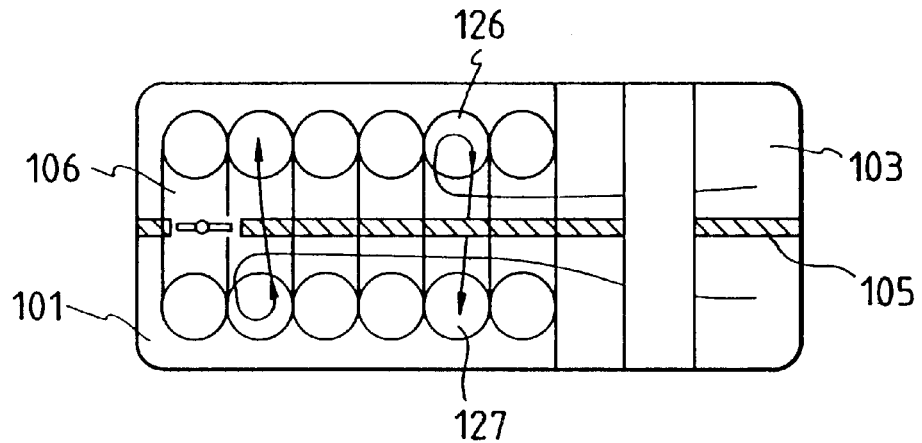
FIG. 49 is a cross section taken along the line B—B in FIG. 46.

A fifteenth preferred embodiment of the present invention is shown in FIGS. 46 to 49. FIG. 47 is a cross section taken along the line C—C in FIG. 46; FIG. 48 is a cross section taken along the line A—A in FIG. 46; and FIG. 49 is a cross section taken along the line B—B in FIG. 46. In this preferred embodiment, a part of the partition 105 is utilized as a substrate of a control unit 125. With this arrangement, it is unnecessary to define a special space for locating the control unit 125. The flow of suction air will be described with reference to FIGS. 47 to 49. The suction air passes through the air cleaner element 108 and is then divided by the partition 105 in the upper horizontal passage 104 as shown in FIG. 47. Then, the suction air flows down in the vertical passage 103 and passes through the throttle portion 102 as shown in FIG. 48. Then, the suction air enters the collector 101 and is led from inlets 126 of individual suction pipes to suction ports 127 of an internal combustion engine as shown in FIG. 49.

Figure 50:
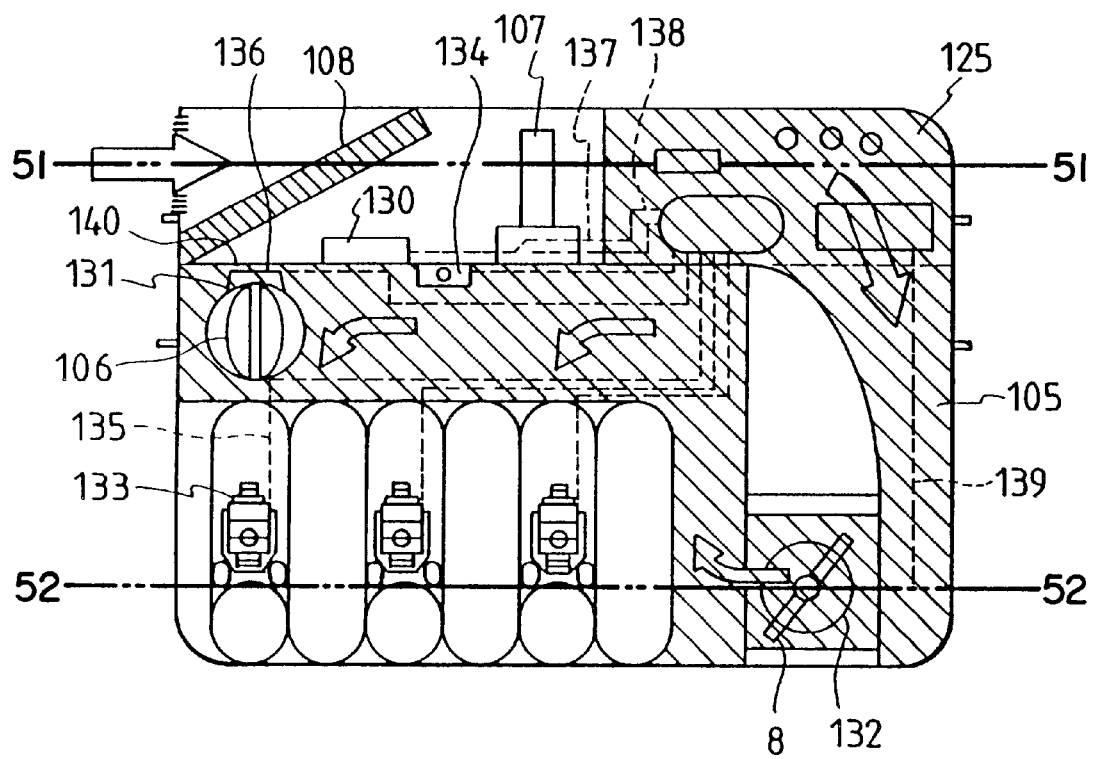
FIG. 50 is a sectional side view of a suction device according to a sixteenth preferred embodiment of the present invention.
Figure 51:
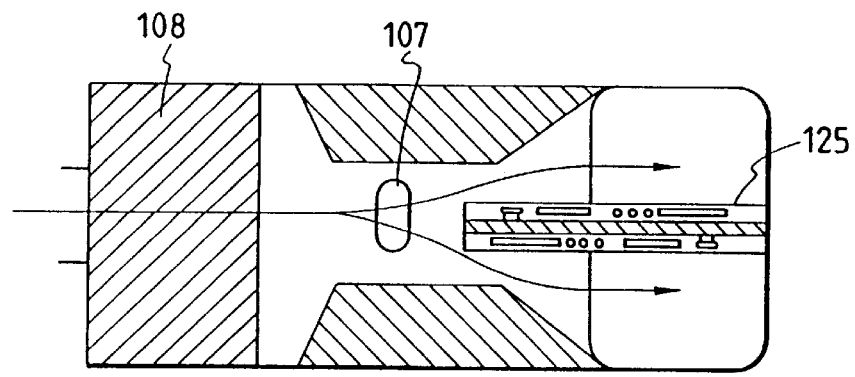
FIG. 51 is a cross section taken along the line B—B in FIG. 50.
Figure 52:
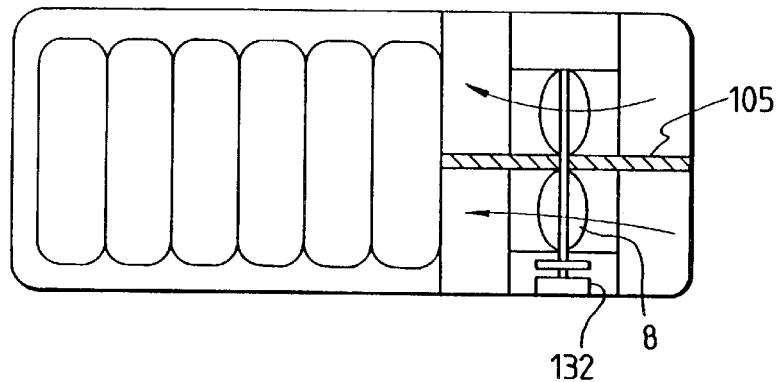
FIG. 52 is a cross section taken along the line A—A in FIG. 50.

A sixteenth preferred embodiment of the present invention is shown in FIGS. 50 to 52. FIG. 51 is a cross section taken along the line B—B in FIG. 50, and FIG. 52 is a cross section taken along the line A—A in FIG. 50. In this preferred embodiment, a part of the vertical partition 105 is utilized as a substrate of the control unit 125 as similar to the fifteenth preferred embodiment shown in FIG. 46. Further, various wiring patterns connected between the control unit 125 and various elements such as the air flow meter 107 and the throttle valves 8 are formed on the vertical partition 105 and a horizontal partition 140. More specifically, a wiring pattern 137 connected to a power switch 130 for an igniter is printed on the horizontal partition 140 and the vertical partition 105. Similarly, there are printed on the horizontal partition 140 and/or the vertical partition 105 a wiring pattern 138 connected to the air flow meter 107, a wiring pattern 136 connected to an actuator 131 for driving the variable induction valve 106, a wiring pattern 139 connected to a motor 132 for driving the throttle valves 8, and a wiring pattern 135 connected to the fuel injection valves 91. With this arrangement, no wire harnesses are required to exhibit various effects such as weight reduction, cost reduction, and space saving. The flow of suction air in this preferred embodiment is similar to that in the fifteenth preferred embodiment shown in FIGS. 47 to 49.

Figure 53:
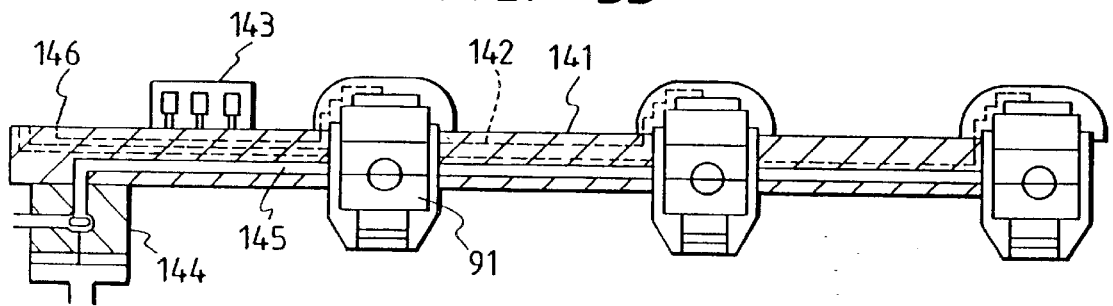
FIG. 53 is a sectional side view of a fuel gallery provided in a suction device according to a seventeenth preferred embodiment of the present invention.
Figure 54:
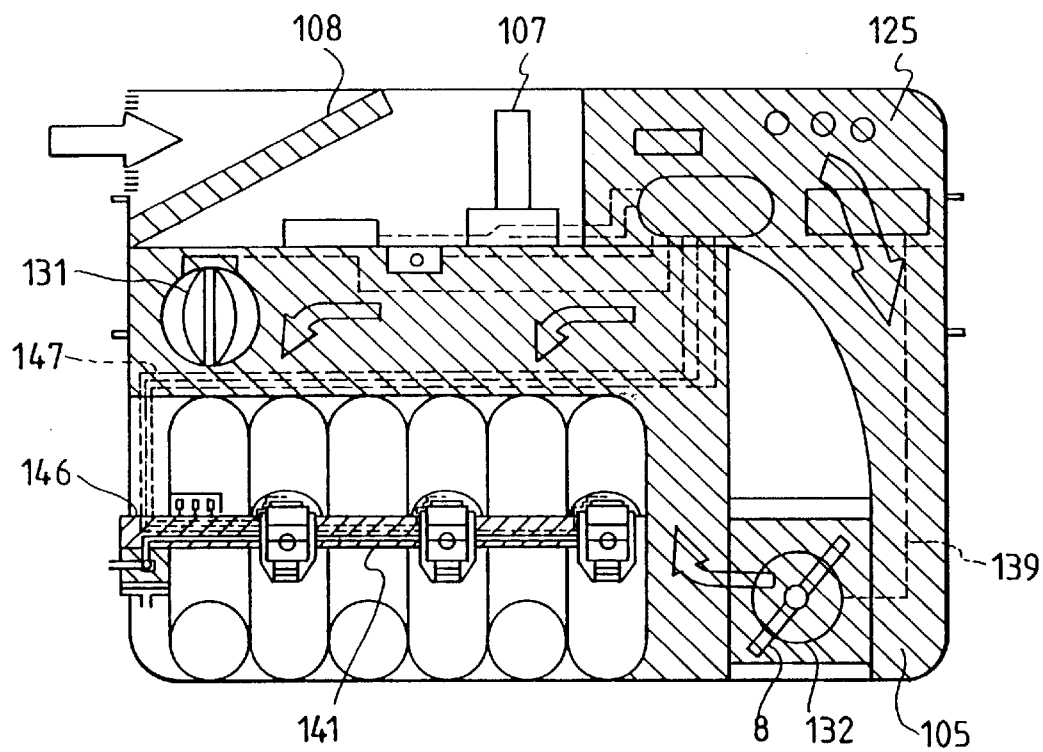
FIG. 54 is a sectional side view of the suction device including the fuel gallery shown in FIG. 53.

A seventeenth preferred embodiment of the present invention is shown in FIGS. 53 and 54. In this preferred embodiment, a wiring 142 is built in a fuel gallery 141 connected to the fuel injection valves 91. The wiring 142 is electrically connected to each fuel injection valve 91 to transmit a signal for controlling a valve opening timing and a valve opening period of each fuel injection valve 91. A power element 143 for driving the fuel injection valves 91 and a fuel pressure regulator 144 are mounted on the fuel gallery 141. While the power element 143 is heated, it is cooled by a fuel flowing in a fuel passage 145 formed in the fuel gallery 141. The wiring 142 is connected to a terminal 146, which is in turn connected to a wiring pattern 147 leading to the control unit 125 as shown in FIG. 54. With this arrangement, the construction of wiring to the fuel injection valves 91 can be simplified.

Figure 55:
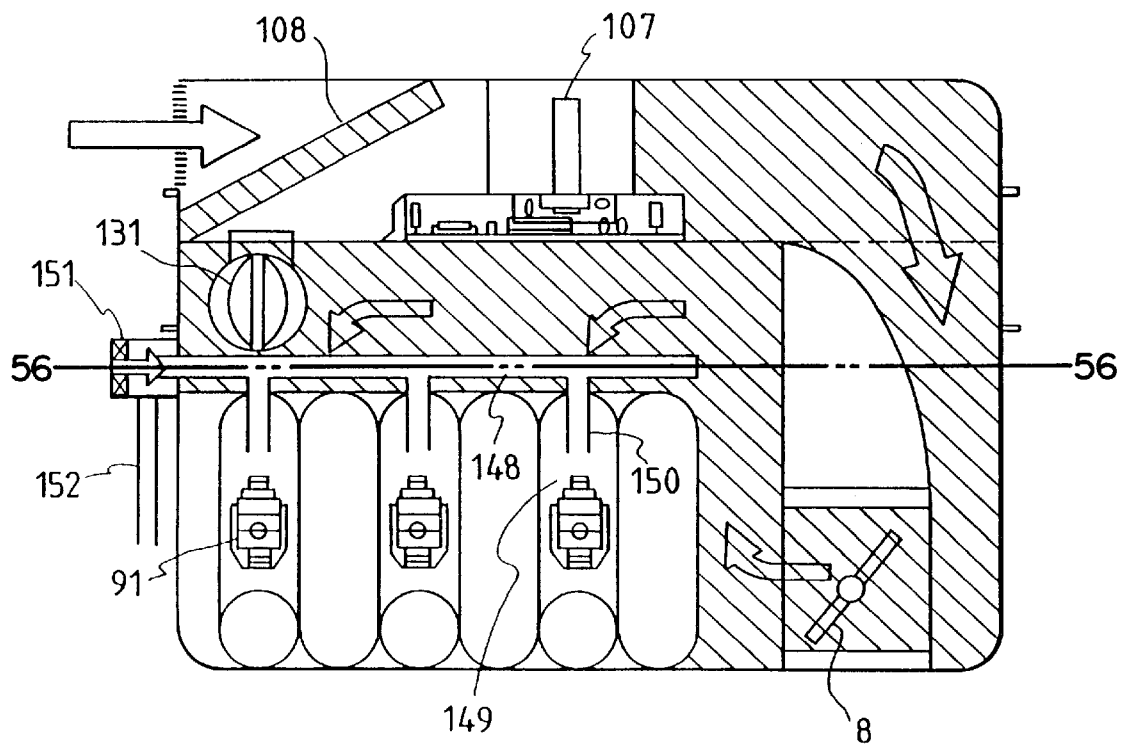
FIG. 55 is a sectional side view of a suction device according to an eighteenth preferred embodiment of the present invention.
Figure 56:
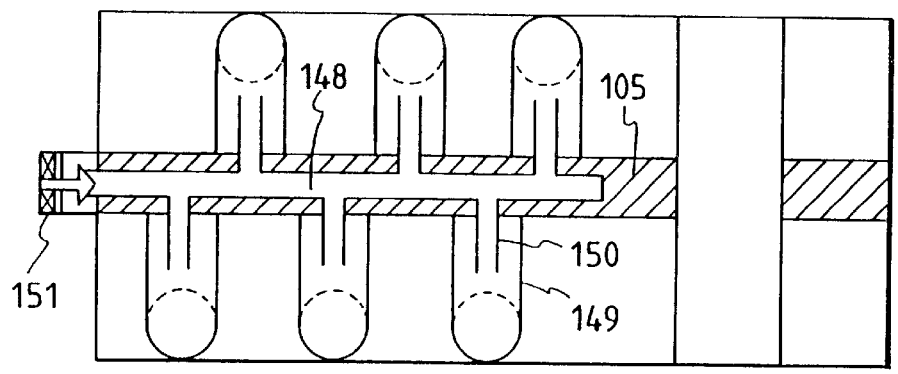
FIG. 56 is a cross section taken along the line A—A in FIG. 55.

An eighteenth preferred embodiment of the present invention is shown in FIGS. 55 and 56. FIG. 56 is a cross section taken along the line A—A in FIG. 55. In this preferred embodiment, an EGR (exhaust gas recirculation) device effective for purification of an exhaust gas is provided. The exhaust gas from an exhaust pipe (not shown) is introduced from a passage 152 through a solenoid valve 151 to a passage 148. As shown in FIG. 56, the passage 148 is formed in the vertical partition 105, and communicate through branch pipes 150 respectively to individual suction pipes 149. Accordingly, the exhaust gas is supplied from the passage 148 through the branch pipes 150 and the individual suction pipes 149 to cylinders of an internal combustion engine. The quantity of the exhaust gas to be supplied to the passage 148 is controlled by the solenoid valve 151.

Figure 57:
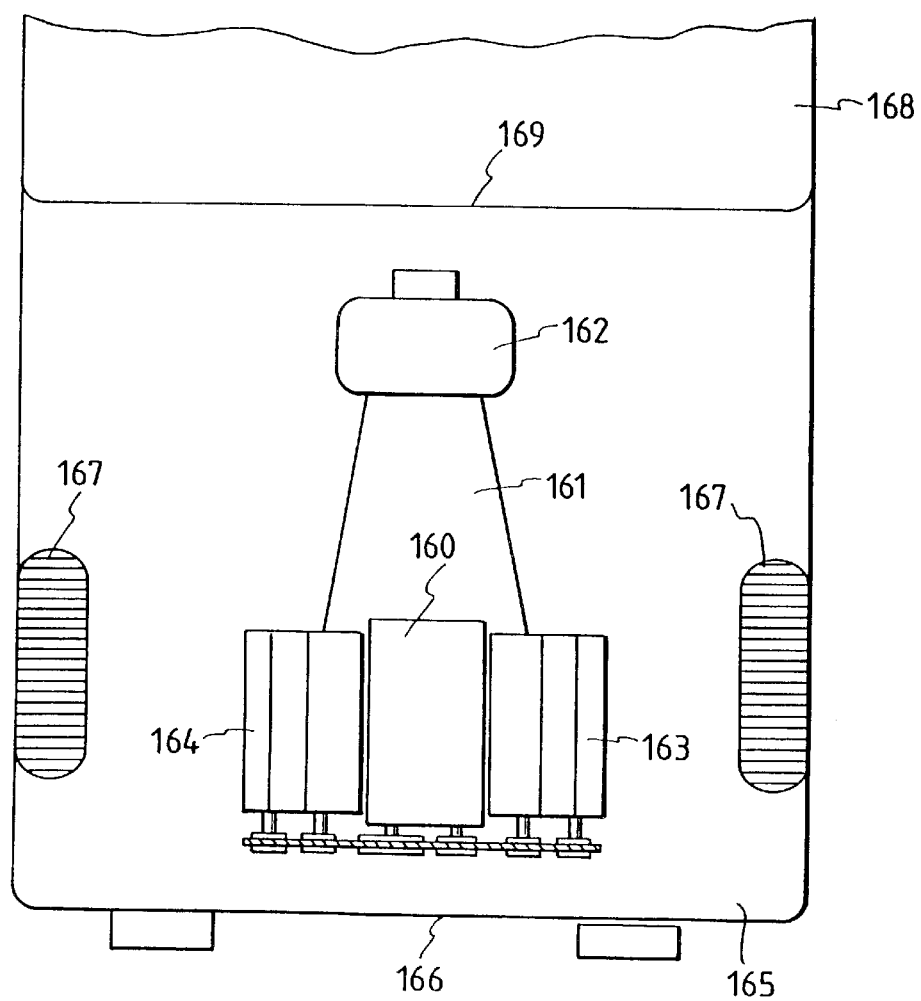
FIG. 57 is a top plan view illustrating a layout in an engine room of an automobile when an engine is longitudinally mounted.
Figure 58:
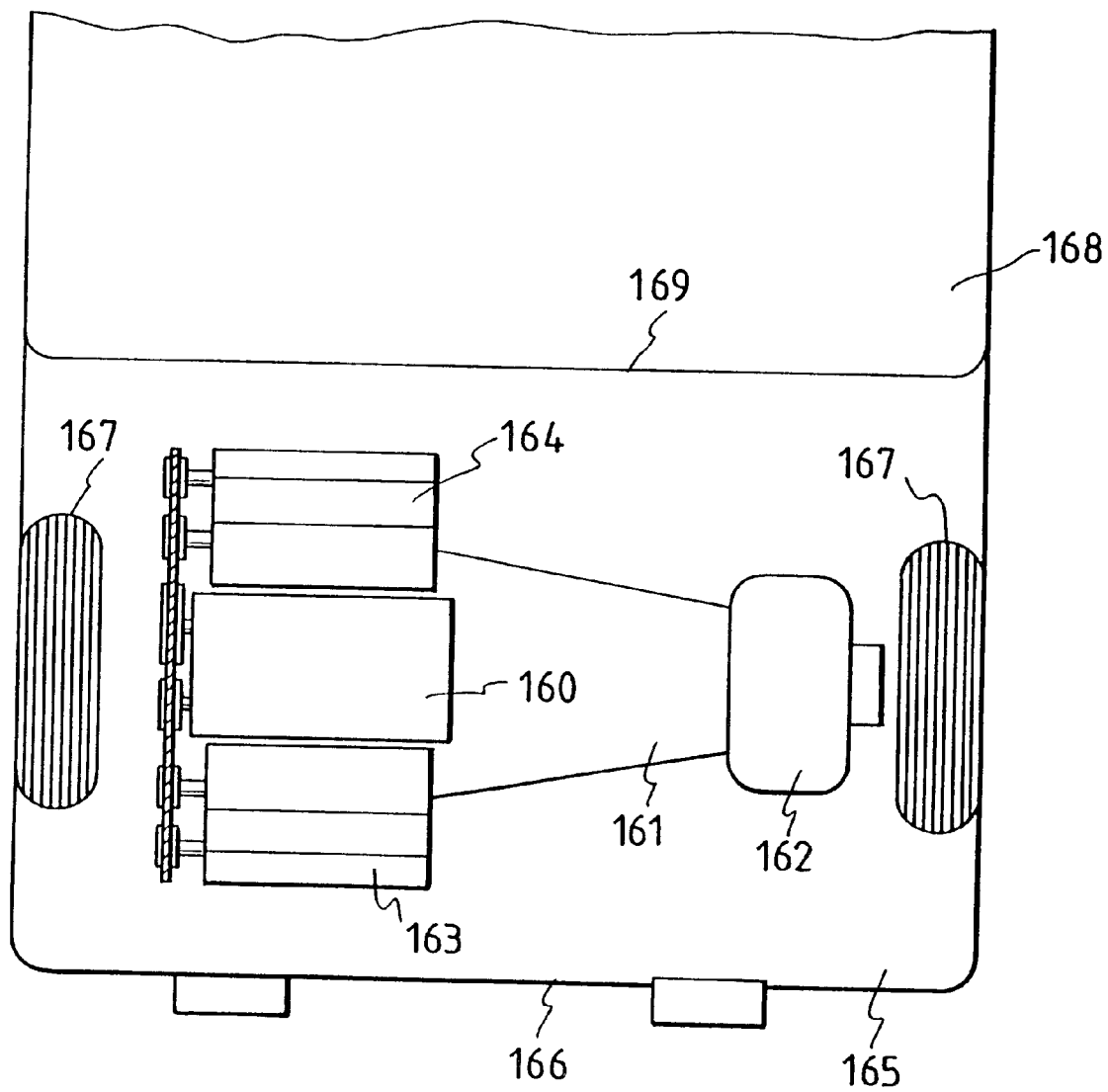
FIG. 58 is a view similar to FIG. 57, when the engine is transversely mounted.

FIGS. 57 and 58 illustrate different layouts of a suction device 160 according to the present invention in an engine room 165 of an automobile 166. The layout shown in FIG. 57 is in the case where a V-type internal combustion engine is longitudinally mounted. In this case, since the suction device 160 is mounted between left and right banks 163 and 164 of the V-type internal combustion engine, side spaces between the engine and tires 167 can be widened, so that other parts can be easily mounted in these spaces and the maintenance can be easily carried out. On the other hand, the layout shown in FIG. 58 is in the case where the V-type internal combustion engine is transversely mounted. In this case, since the suction device 160 is mounted between the left and right banks 163 and 164 of the engine, a partition 169 between the engine room 165 and a cabin 168 can be shifted frontward of the automobile 166. That is, the space of the engine room 165 can be reduced to thereby enlarge the space of the cabin 168. In this manner, various merits on the automobile 166 can be obtained owing to a compact design of the suction device 160.

According to the present invention, the suction device including the air cleaner to the suction ports is compact, so that the space of the engine room can be effectively used in such a manner that a mounting space for other parts can be widened, the maintenance can be easily carried out, and a cabin space can be enlarged.

We claim:

1. A suction device for an internal combustion engine, comprising:
   a casing having an air inlet and a plurality of outlets;
   a filter in the casing for filtering air from said air inlet;
   a collection chamber in the casing for receiving air from the filter;
   at least one throttle valve in the casing for controlling the flow of air from said filter to said collection chamber;
   a plurality of suction pipes each of said suction pipes extending within the casing from the collection chamber to a corresponding one of the plurality of outlets; and
   an exhaust recirculation passage communicating with said plurality of suction pipes.

2. A suction device for an internal combustion engine, comprising:

a casing having an air inlet and a plurality of outlets;

a filter in the casing for filtering air from said air inlet;

a collection chamber in the casing for receiving air from the filter;

at least one throttle valve in the casing for controlling the flow of air from said filter to said collection chamber;

a plurality of suction pipes each of said suction pipes extending within the casing from the collection chamber to a corresponding one of the plurality of outlets;

a plurality of swirl control valves in said plurality of suction pipes; and a common shaft for driving said swirl control valves.

3. A suction device for an internal combustion engine, comprising:

a casing having an air inlet and a plurality of outlets;

a filter in the casing for filtering air from said air inlet;

a collection chamber in the casing for receiving air from the filter;

at least one throttle valve in the casing for controlling the flow of air from said filter to said collection chamber; and a plurality of suction pipes each of said suction pipes extending within the casing from the collection chamber to a corresponding one of the plurality of outlets, wherein a wall divides said collection chamber into first and second regions, some of said suction pipes extending from said first region and others of said suction pipes extending from said second region; and there is a control valve in said wall for controlling air pressure between said first and second regions.

4. A suction device according to claim 3, wherein said at least one throttle valve comprises first and second throttle valves, said first throttle valve communicating with said first region and said second throttle valve communicating with said second region.

5. A suction device for an internal combution engine, comprising:

a casing having an air inlet and a plurality of outlets;

a collection chamber in the casing for receiving air from the air inlet;

at least one throttle valve for controlling the air received by the collection chamber from said air inlet;

a plurality of suction pipes in the casing, each of said suction pipes extending within the casing from the collection chamber to a corresponding one of the plurality of outlets;

wherein:

a wall divides said collection chamber into first and second regions, some of said suction pipes extending from said first region and others of said suction pipes extending from said second region; and there is a control valve in said wall for controlling air pressure between said first and second regions.

6. A suction device according to claim 5, wherein said at least one throttle valve comprises first and second throttle valves, said first throttle valve communicating with said first region and said second throttle valve communicating with said second region.

7. An engine assembly comprising:

an internal combution engine having a plurality of cylinders arranged in a V-shape; and a suction device, said suction device having:

a casing having an air inlet and a plurality of outlets;

a collection chamber in the casing for receiving air from the air inlet;

at least one throttle valve for controlling the air received by the collection chamber from said air inlet;

a plurality of suction pipes in the casing, each of said suction pipes extending within the casing from the collection chamber to a corresponding one of the plurality of outlets;

wherein:

a wall divides said collection chamber into first and second regions, some of said suction pipes extending from said first region and others of said suction pipes extending from said second region; and there is a control valve in said wall for controlling air pressure between said first and second region; and wherein each of said plurality of suction pipes is connected to a corresponding one of said plurality of cylinders.

8. A suction device for an internal combustion engine, comprising: a collection chamber for receiving air from an air inlet, a plurality of suction pipes, each suction pipe having an inlet portion communicating with the collection chamber and an outlet portion for connection to a respective cylinder of the engine, a plurality of swirl ducts extending from said collection chamber to outlet portions of respective ones of said plurality of suction pipes, and a plurality of swirl control valves in said suction pipes for controlling the relative flow of air from said collection chamber to said outlet portions through the plurality of suction pipes and the plurality of swirl ducts, wherein the suction pipes are arranged side-by-side and adjacent suction pipes cross each other, the swirl control valves being provided in respective crossing portions of the suction pipes and being carried by a common shaft by which they are controlled.

9. A suction device according to claim 1, wherein each swirl control valve is partially cut away.

10. A suction device according to claim 1, wherein the axial direction of the common shaft on which the swirl control valves are carried is perpendicular to the axial direction of the shaft of a throttle valve for controlling the air flow through the collection chamber.

11. A suction device for an internal combustion engine, comprising:

a casing having an air inlet and a plurality of outlets;

a collection chamber in the casing for receiving air from the air inlet;

a plurality of suction pipes in the casing, each of said suction pipes extending within the casing from the collection chamber to a corresponding one of the plurality of outlets;

a plurality of swirl ducts in the casing, the swirl ducts extending from said collection chamber to said plurality of outlets;

a plurality of swirl control valves in said suction pipes for controlling the relative flows of air from said collection chamber to said plurality of outlets through the plurality of suction pipes and the plurality of swirl ducts; and a common shaft for driving said swirl control valves.

12. A suction device for an internal combustion engine, comprising:

a casing having an air inlet and a plurality of outlets;

a filter in the casing for filtering air from said air inlet;

a collection chamber in the casing for receiving air from the filter;

at least one throttle valve in the casing for controlling the flow of air from said filter to said collection chamber;

a plurality of suction pipes, each of said suction pipes extending within the casing from the collection chamber to a corresponding one of the plurality of outlets;

a plurality of swirl control valves in said plurality of suction pipes;

a common shaft for driving said swirl control valves; and an exhaust recirculation passage communicating with said plurality of suction pipes.

13. A suction device according to claim 12, wherein a wall divides said collection chamber into first and second regions, some of said suction pipes extending front said first region and others of said suction pipes extending from said second region; and wherein a control valve is located in said wall for controlling air pressure between said first and second regions.

14. A suction device for an internal combustion engine, comprising:

a casing having an air inlet and a plurality of outlets;

a filter unit containing a filter having an inlet and outlet and being elongate from said inlet to said outlet of said filter unit;

a collection chamber disposed in the casing for receiving air from the filter;

a plurality of suction pipes, each of said suction pipes extending within the casing from said collection chamber to a respective one of said plurality of outlets; and an air distribution unit including a connection path having at least one throttle valve for controlling an amount of said air and being formed by said plurality of suction pipes and said collection chamber, wherein said filter unit and said air distribution unit are associated by a common wall, and wherein walls of said filter unit, said air distribution unit and said connection path are formed as the casing.

15. A suction device according to claim 14, further comprising a plurality of swirl control valves in said plurality of suction pipes and a common shaft for driving said swirl control valves.

* * * * *